(12) United States Patent
Yasui et al.

(10) Patent No.: US 11,494,950 B2
(45) Date of Patent: Nov. 8, 2022

(54) EXPERIENCE PROVIDING SYSTEM, EXPERIENCE PROVIDING METHOD, AND EXPERIENCE PROVIDING PROGRAM

(71) Applicant: HONDA MOTOR CO., LTD., Tokyo (JP)

(72) Inventors: Yuji Yasui, Wako (JP); Shion Tokunaga, Wako (JP); Nobuyuki Watanabe, Wako (JP); Kazuki Nishioka, Wako (JP); Yudai Hirohata, Wako (JP); Hisakazu Yamane, Tokyo (JP); Takayuki Shimoyamada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 16/621,457

(22) PCT Filed: Jun. 15, 2018

(86) PCT No.: PCT/JP2018/022849
§ 371 (c)(1),
(2) Date: Dec. 11, 2019

(87) PCT Pub. No.: WO2018/230688
PCT Pub. Date: Dec. 20, 2018

(65) Prior Publication Data
US 2021/0150772 A1    May 20, 2021

(30) Foreign Application Priority Data
Jun. 16, 2017    (JP) .............................. JP2017-118702

(51) Int. Cl.
*G06T 11/00* (2006.01)
*B60W 60/00* (2020.01)
(Continued)

(52) U.S. Cl.
CPC .............. *G06T 11/00* (2013.01); *B60K 35/00* (2013.01); *B60W 40/08* (2013.01); *B60W 50/14* (2013.01);
(Continued)

(58) Field of Classification Search
CPC ..... G06T 11/00; B60W 60/001; B60W 40/08; B60W 50/14; B60W 2050/146;
(Continued)

(56) References Cited

U.S. PATENT DOCUMENTS

2005/0251395 A1    11/2005    Lich et al.
2014/0113619 A1*    4/2014    Tibbitts ................ B60W 40/09
                                                    455/419

(Continued)

FOREIGN PATENT DOCUMENTS

JP    11-037766    2/1999
JP    2003-339681    12/2003
(Continued)

OTHER PUBLICATIONS

International Search Report and Written Opinion for International Application Serial No. PCT/JP2018/022849 dated Aug. 28, 2018, 8 pages.
(Continued)

*Primary Examiner* — Jin Ge
(74) *Attorney, Agent, or Firm* — Amin, Turocy & Watson, LLP

(57) ABSTRACT

An experience providing system includes: a passenger information detector configured to detect information regarding a passenger of a vehicle; an outside information detector configured to detect information outside the vehicle; an output section configured to output sound; a virtual image generator configured to output display; and a provider configured to dynamically provide an interaction to the
(Continued)

passenger of the vehicle by causing the sound output from the output section to be synchronized with the display output from the virtual image generator on the basis of detection results of the passenger information detector and the outside information detector.

15 Claims, 13 Drawing Sheets

(51) Int. Cl.
| | |
|---|---|
| *B60K 35/00* | (2006.01) |
| *B60W 40/08* | (2012.01) |
| *B60W 50/14* | (2020.01) |
| *G06F 3/16* | (2006.01) |
| *G06V 20/56* | (2022.01) |
| *G06V 20/59* | (2022.01) |

(52) U.S. Cl.
CPC .......... *B60W 60/001* (2020.02); *G06F 3/165* (2013.01); *G06V 20/56* (2022.01); *G06V 20/59* (2022.01); *B60K 2370/157* (2019.05); *B60K 2370/1529* (2019.05); *B60W 2050/146* (2013.01)

(58) Field of Classification Search
CPC ........ G06V 20/59; G06V 20/56; B60K 35/00; B60K 2370/1529; B60K 2370/157; G06F 3/165

USPC ........................................................ 345/633
See application file for complete search history.

(56) References Cited

U.S. PATENT DOCUMENTS

| | | | |
|---|---|---|---|
| 2015/0062168 A1* | 3/2015 | Ng-Thow-Hing | G06F 3/013 |
| | | | 345/633 |
| 2016/0001781 A1* | 1/2016 | Fung | G16H 50/20 |
| | | | 701/36 |
| 2017/0103571 A1* | 4/2017 | Beaurepaire | G06F 3/011 |
| 2017/0155867 A1* | 6/2017 | Yokota | H04N 5/44504 |
| 2018/0154854 A1* | 6/2018 | Thieberger | G02B 27/017 |
| 2020/0050345 A1* | 2/2020 | Mugura | G06F 3/017 |

FOREIGN PATENT DOCUMENTS

| | | |
|---|---|---|
| JP | 2006-510073 | 3/2006 |
| JP | 2010-184610 | 8/2010 |
| JP | 2010-217956 | 9/2010 |
| JP | 2016-539346 | 12/2016 |
| JP | 2017-030737 | 2/2017 |
| WO | 2015/042005 | 3/2015 |

OTHER PUBLICATIONS

Japanese Office Action for Japanese Patent Application No. 2020-006391 dated Sep. 6, 2022.

* cited by examiner

EXPERIENCE PROVIDING SYSTEM, EXPERIENCE PROVIDING METHOD, AND EXPERIENCE PROVIDING PROGRAM

TECHNICAL FIELD

Aspects of the invention relate to an experience providing system, an experience providing method, and an experience providing program.

Priority is claimed on Japanese Patent Application No. 2017-118702, filed Jun. 16, 2017, the content of which is incorporated herein by reference.

BACKGROUND ART

In the related art, automated driving for automatically performing at least one of speed control and steering control has been studied. In this regard, technologies for causing images with depth to be displayed such that observers can have a sense of depth have been disclosed (see Patent Document 1, for example).

CITATION LIST

Patent Literature

Patent Document 1

Japanese Unexamined Patent Application, First Publication No. 2017-30737

SUMMARY OF INVENTION

Technical Problem

The related art technologies have not taken entertaining of passengers of vehicles into consideration.

The invention was made in consideration of such circumstances, and an objective thereof is to provide an experience providing system, an experience providing method, and an experience providing program capable of providing ways to entertain passengers of vehicles, which have never been achieved.

Solution to Problem

An experience providing system, an experience providing method, and an experience providing program according to the invention employ the following configurations.

(1): According to an aspect of the invention, there is provided an experience providing system including: a passenger information detector configured to detect information regarding a passenger of a vehicle; an outside information detector configured to detect information outside the vehicle; an output section configured to output sound; a virtual image generator configured to output display; and a provider configured to dynamically provide an interaction to the passenger of the vehicle by causing the sound output from the output section to be synchronized with the display output from the virtual image generator on the basis of detection results of the passenger information detector and the outside information detector.

(2): In the aspect (1), the virtual image generator is configured to cause a virtual image to appear so as to be superimposed on a captured image associated with a seat of the vehicle.

(3): In the aspect (1), the virtual image generator is configured to cause a virtual image to appear so as to associate with a seat mirror image position of the vehicle when seen by the passenger.

(4): In the aspect (1), the provider adjusts a timing at which the output section is caused to perform an utterance on the basis of a situation outside the vehicle detected by the outside information detector.

(5): In the aspect (4), an ability to detect information outside the vehicle that the outside information detector has is similar to an ability to detect the information outside the vehicle that the passenger of the vehicle has.

(6): In the aspect (1), the interaction that the provider provides includes sound associated with music that is being heard in the vehicle and is detected by the passenger information detector.

(7): In the aspect (1), the provider is configured to cause music that the output section outputs to be synchronized with display that the virtual image generator outputs.

(8): In the aspect (7), the passenger information detector includes a storage configured to detect and store a state of the passenger of the vehicle in response to an interaction that the provider provides, and the passenger information detector is configured to change the interaction that the passenger of the vehicle is able to use on the basis of the state stored in the storage.

(9): In the aspect (1), the vehicle is an automated driving vehicle, and the provider is configured such that the passenger information detector determines whether or not automated driving of the vehicle is being executed, and the provider is configured to restrict at least some action forms of the interaction during non-automated driving.

(10): In the aspect (1), the provider is configured to execute the interaction using a determiner provided outside the vehicle.

(11): In the aspect (1), the interaction is provided through an output from an external processor, the external processor configured to process signals detected by the passenger information detector and the outside information detector outside the vehicle.

(12): In the aspect (1), the passenger information detector is configured to be able to detect an interaction that has already been provided by the provider, and the provider dynamically provides an interaction to the passenger of the vehicle on the basis of detection results of the passenger information detector and the outside information detector including the interaction that has already been provided.

(13): In the aspect (1), when a plurality of interactions to be provided by the provider are present, the provider determines execution timings of the plurality of interactions or whether or not the plurality of interactions are able to be executed on the basis of detection results of the passenger information detector and the outside information detector.

(14): In the aspect (1), the experience providing system further includes: an event determiner configured to detect occurrence of an event on the basis of detection results of the passenger information detector and the outside information detector, and the event determiner includes a local determiner that is configured to determine an event in the vehicle, and a remote determiner that is configured to determine an event using an external server that is connected to the vehicle for communication.

(15) In the aspect (1), the experience providing system further includes: an event determiner configured to detect occurrence of an event on the basis of detection results of the passenger information detector and the outside information detector; and an interaction controller configured to control an interaction provided by the provider on the basis of the detection results of the passenger information detector and the outside information detector, the event determiner is configured to continue detection of occurrence of the event in parallel to execution of the interaction controller, and the provider dynamically provides the interaction on the basis of the occurrence of the event detected during provision of the interaction.

(16): According to an aspect, there is provided an experience providing method including, by a vehicle-mounted computer: detecting passenger information; detecting outside information; outputting sound; outputting display; and dynamically providing an interaction to a passenger of a vehicle by causing the output sound to be synchronized with an output virtual image on the basis of the passenger information and the outside information.

(17): According to an aspect of the invention, there is provided an experience providing program including, causing a vehicle-mounted computer to: detect passenger information; detect outside information; output sound; output display; and dynamically provide an interaction to a passenger of a vehicle by causing the output sound to be synchronized with an output virtual image on the basis of the passenger information and the outside information.

Advantageous Effects of Invention

According to (1), (5), (14), (16), or (17), it is possible to provide ways to entertain the passenger of the vehicle, which have never been achieved.

According to (2), it is possible to provide an illusion as if the virtual image is in the vehicle together to the passenger of the vehicle.

According to (3), it is possible to allow the passenger of the vehicle to see an illusion as if the virtual image is seated in a seat of the vehicle.

According to (4), it is possible to entertain the passenger with utterance and actions of the virtual image dynamically changing in accordance with a situation of the passenger of the vehicle and a situation outside the vehicle.

According to (6), it is possible to cause the virtual image to perform an utterance from which empathy of the passenger of the vehicle can be obtained.

According to (7) or (8), it is possible to provide ways to enjoy the interaction, which have never been achieved, to the passenger of the vehicle.

According to (9), it is possible to improve safety during non-automated driving of the vehicle.

According to (10), it is possible to reduce costs of the vehicle by executing the interaction using the determiner provided outside the vehicle as compared with a case in which the determiner is provided in the vehicle.

According to (11), it is possible to reduce costs of the vehicle by providing the interaction through an output of the external processor that processes signals detected by the passenger information detector and the outside information detector outside the vehicle.

According to (12) or (13), it is possible to provide an interaction that is more suitable for a state of the passenger or an environment of the surroundings of the passenger to the passenger.

According to (15), the provider can provide an appropriate interaction to the passenger even during provision of the interaction.

BRIEF DESCRIPTION OF DRAWINGS

FIG. 9 is a flowchart showing an example of a flow of processing in which an utterance generator generates original data of utterance of a virtual image regarding a tourist place and the like.

DESCRIPTION OF EMBODIMENTS

Hereinafter, embodiments of an experience providing system, an experience providing method, and an experience providing program according to the invention will be described with reference to drawings. The experience providing system is a system that provides interactions (for example, entertainment content) for entertaining a passenger of a vehicle to the passenger of the vehicle. The interaction include sound associated with music that is being heard in the vehicle.

[Overall Configuration]

Figure 1:
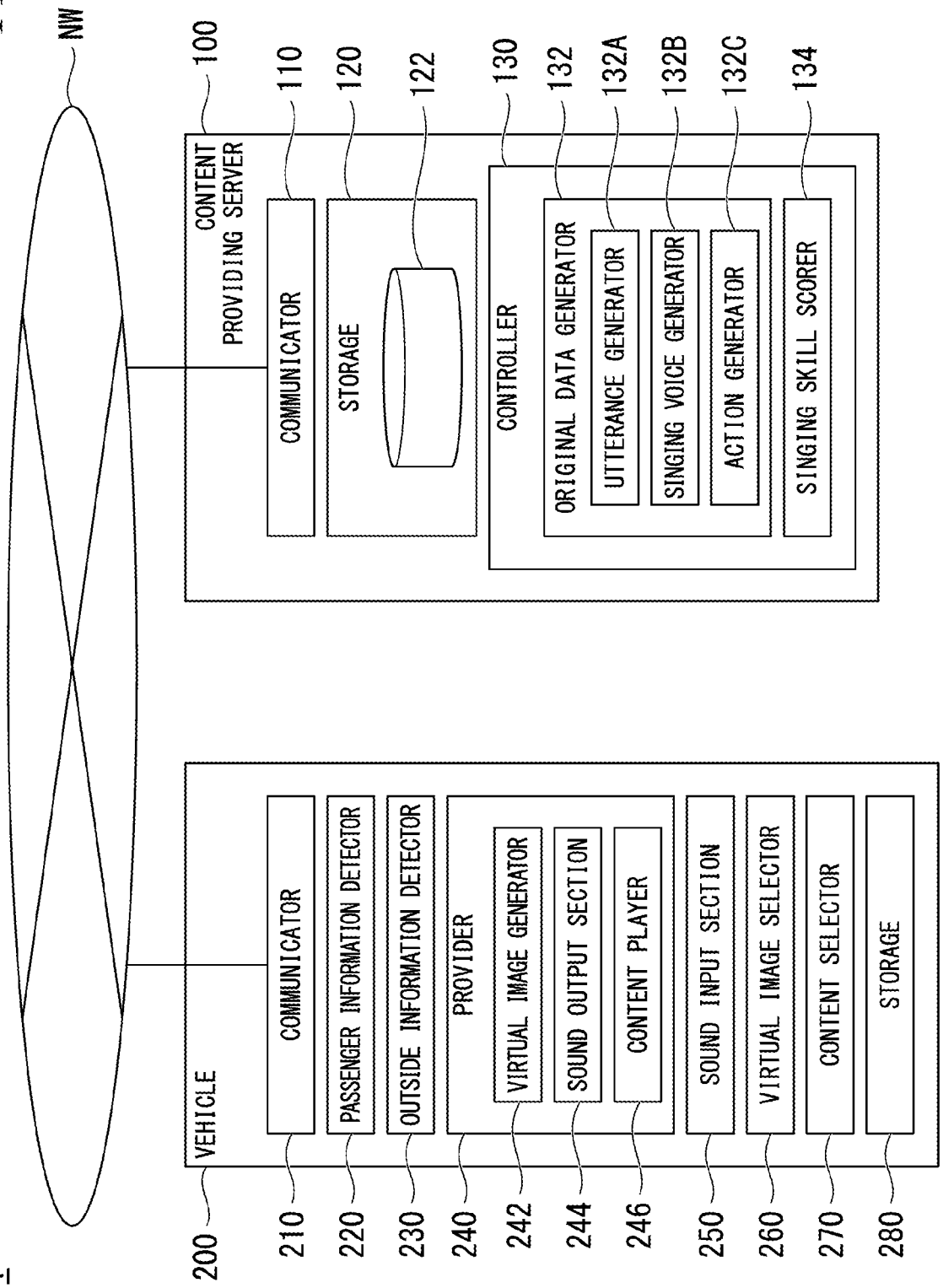
FIG. 1 is a configuration diagram of an experience providing system.

FIG. 1 is a configuration diagram of an experience providing system 1. The experience providing system 1 includes, for example, a content providing server 100 that provides content and a vehicle 200 that is provided with the content from the content providing server 100 and provides the content to a passenger. These components can communicate with each other via a network NW. The network NW includes the Internet, a wide area network (WAN), a local area network (LAN), a public line, a provider device, a dedicated line, a wireless base station, and the like.

[Vehicle]

First, the vehicle 200 will be described. The vehicle 200 includes, for example, a communicator 210, a passenger information detector 220, an outside information detector 230, a provider 240, a sound input section 250, a virtual image selector 260, a content selector 270, and a storage 280.

The communicator 210 is a wireless communication module for connection to the network NW. The communicator 210 performs wireless communication on the basis of Wi-Fi, dedicated short range communications (DSRC), Bluetooth (registered trademark), or other communication standard. A plurality of communicators 210 may be prepared in accordance with applications. The communicator 210 performs communication with the content providing server 100 via the network NW.

The passenger information detector 220 detects information regarding a passenger of the vehicle 200. The information regarding the passenger is, for example, a facial expression of the passenger, whether or not the passenger has made some utterance, and whether or not the passenger is seated in a seat in the vehicle. The passenger information detector 220 includes, for example, a part or all of an in-vehicle camera, an in-vehicle microphone, a seating sensor, and the lie. The passenger information detector 220 detects the information regarding the passenger of the vehicle 200 at a predetermined cycle and transmits the detected information to the content providing server 100 via the communicator 210 and the network NW, for example.

The outside information detector 230 detects information outside the vehicle 200. The information outside the vehicle is, for example, a sight outside the vehicle, sound outside the vehicle, and the like. The outside information detector 230 includes a part or all of an outside-vehicle camera, an outside-vehicle microphone, and the like. The outside information detector 230 detects the information outside the vehicle 200 at a predetermined cycle and transmits the detected information to the content providing server 100 via the communicator 210 and the network NW.

The provider 240 includes, for example, a virtual image generator 242, a sound output section 244, and a content player 246. The virtual image generator 242 generates a virtual image of a person who entertains the passenger of the vehicle 200, for example. The virtual image generator 242 is configured to cause the virtual image (display) of the person who can be visually recognized by the passenger of the vehicle 200, on the basis of original data received from the content providing server 100. The virtual image generator 242 includes, for example, a part or all of a projection device, a window, a mirror, a display, a hologram projection device, and the like.

The sound output section 244 outputs sound for entertaining the passenger of the vehicle 200, for example. The sound output section 244 outputs the sound on the basis of original data received form the content providing server 100. The sound output section 244 includes, for example, a speaker.

The content player 246 provides, to the passenger of the vehicle 200, content obtained by causing sound output from the sound output section 244 to be synchronized (or coordinated) with actions of the virtual image that is caused to appear by the virtual image generator 242. That is, the content player 246 causes the sound (for example, a music) output from the sound output section 244 to be synchronized with display (for example, actions of the virtual image) output from the virtual image generator 242. The content player 246 causes the sound and the actions of the virtual image to be coordinated (that is, move in a conjunction manner) using MikuMikuDance (MMD) disclosed in Japanese Unexamined Patent Application, First Publication No. 2016-41142, for example.

The sound input section 250 receives inputs such as singing voice of the passenger of the vehicle 200, for example. The sound input section 250 includes, for example, a singing microphone. The sound input section 250 transmits a signal (data) indicating a singing voice or the like of the passenger of the vehicle 200 to a singing skill scorer 134, for example, of the content providing server 100 via the communicator 210 and the network NW.

The virtual image selector 260 receives, from the passenger of the vehicle 200, selection of a virtual image of a person that is caused to appear by the virtual image generator 242. The virtual image selector 260 transmits data indicating details of the received selection to the content providing server 100.

The content selector 270 receives, from the passenger of the vehicle 200, content selection provided by the content providing server 100. The content selector 270 transmits data indicating details of the received selection to the content providing server 100.

The storage 280 is realized by a hard disk drive (HDD), a flash memory, a random access memory (RAM), a read only memory (ROM), or the like. The storage 280 stores information received from the content providing server 100, information regarding the passenger detected by the passenger information detector 220, information outside the vehicle 200 detected by the outside information detector 230, data such as singing voice of the passenger of the vehicle 200 received by the sound input section 250, and the like.

Figure 2:
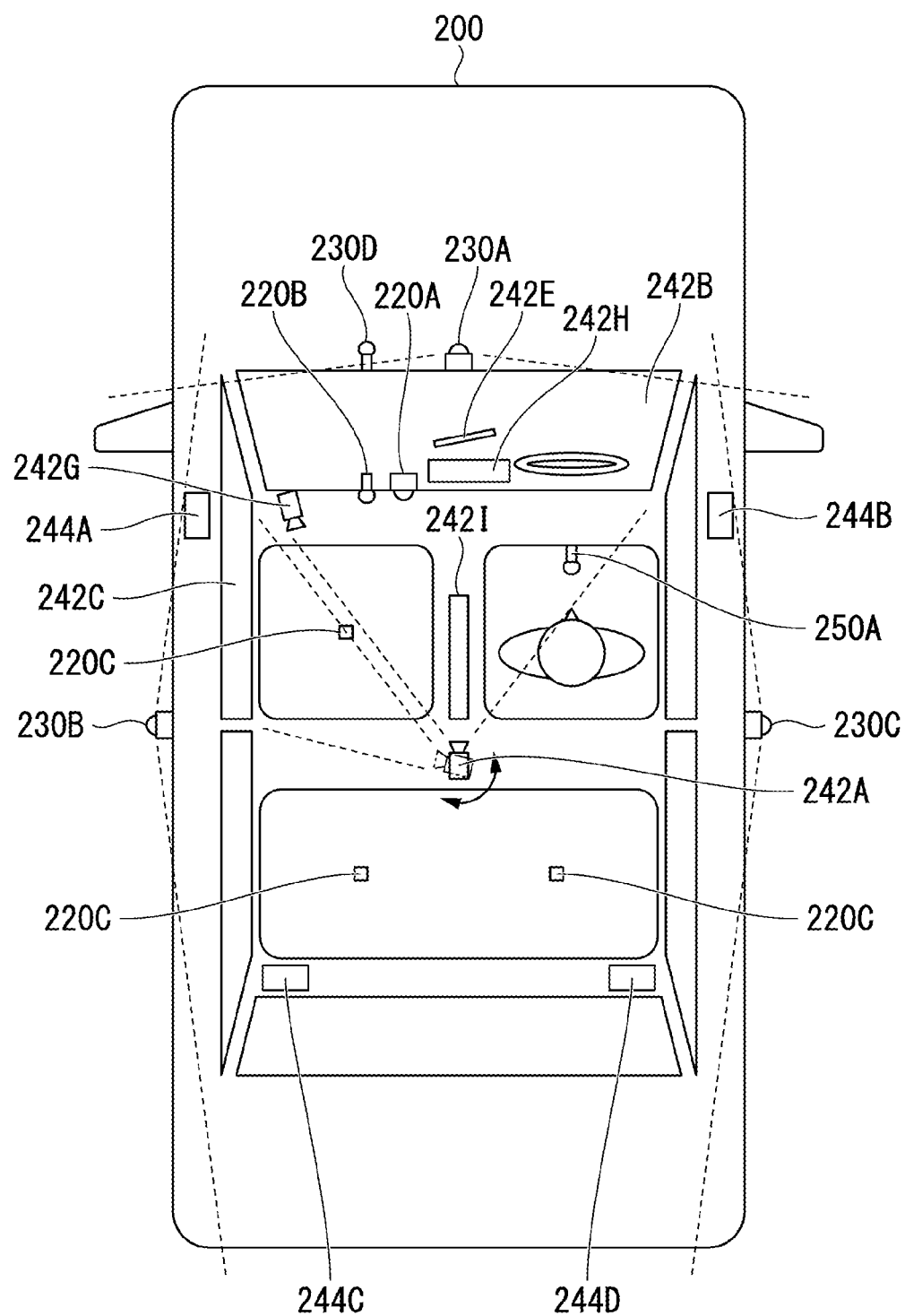
FIG. 2 is a diagram showing an example of a vehicle-mounted device including a passenger information detector.

FIG. 2 is a diagram showing an example of a vehicle-mounted device including the passenger information detector 220. In the example in FIG. 2, the passenger information detector 220 includes an in-vehicle camera 220A, an in-vehicle microphone 220B, and a seating sensor 220C. The in-vehicle camera 220A images a face, for example, of the passenger and outputs the image. The in-vehicle camera 220A transmits data of the captured image to the content providing server 100.

The in-vehicle microphone 220B acquires sound in the vehicle. The in-vehicle microphone 220B transmits data of the acquired sound in the vehicle to the content providing server 100.

The seating sensor 220C detects whether or not the passenger is seated in a seat provided with the seating sensor 220C on the basis of a pressure applied to the seating sensor 220C. The seating sensor 220C transmits a signal (data) indicating whether or not the passenger is seated to the content providing server 100.

In the example in FIG. 2, the outside information detector 230 includes outside-vehicle cameras 230A to 230C and an outside-vehicle microphone 230D. The outside information detector 230 may include an illuminance sensor, a rain drop sensor, a humidity sensor, a navigation device provided with a GNSS receiver and map information, a gyro sensor, a vehicle speed sensor, and the like.

The outside-vehicle camera 230A captures an image of a front sight of the vehicle 200. The outside-vehicle camera 230A transmits data of captured image of the sight to the content providing server 100.

The outside-vehicle camera 230B captures an image of a sight on a left side of the vehicle 200. The outside-vehicle camera 230B transmits data of the captured image of the sight to the content providing server 100.

The outside-vehicle camera 230C captures an image of a sight on the right side of the vehicle 200. The outside-vehicle camera 230C transmits data of the captured image of the sight to the content providing server 100.

The outside-vehicle microphone 230D acquires sound outside the vehicle. The outside-vehicle microphone 230D transmits data of the acquired sound outside the vehicle to the content providing server 100.

In the example in FIG. 2, the virtual image generator 242 includes a projection device 242A, a front window 242B, a left-side window 242C, a mirror 242E, a hologram projection device 242G, a touch panel-type display device 242H, and a transmission panel-type display 242I.

The projection device 242A projects a virtual image on the front window 242B, the left-side window 242C, or the mirror 242E and causes the virtual image that can be visually recognized by the passenger of the vehicle 200 to appear. The hologram projection device 242G projects a virtual image (hologram) on a vacant seat and causes the virtual image that can be visually recognized by the passenger of the vehicle 200 to appear. The projection device 242A or the hologram projection device 242G causes a virtual image to appear with a scale of at least 70% or more. The projection device 242A or the hologram projection device 242G causes a virtual image that is seen by the passenger of the vehicle 200 as an illusion as if the virtual image is seated in the seat of the vehicle 200 to appear.

Figure 3:
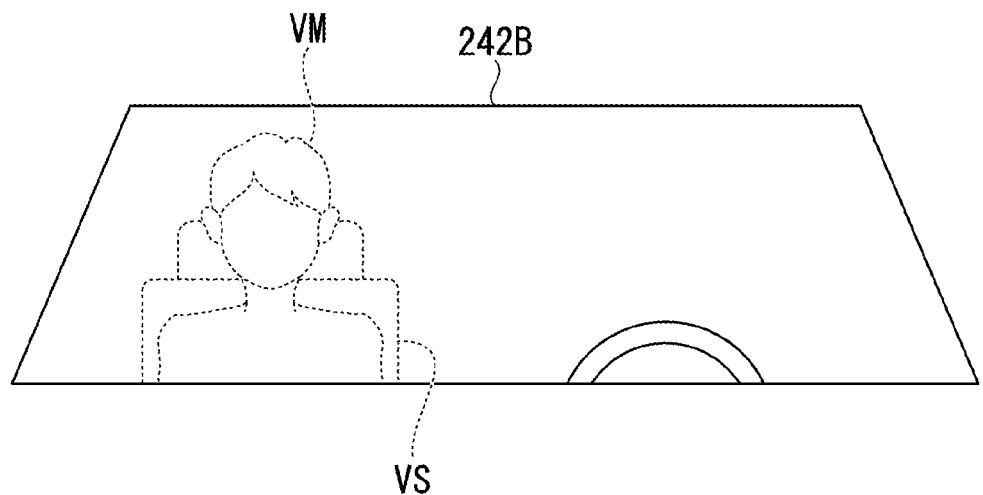
FIG. 3 is a diagram showing an example in which a projection device projects a virtual image and a virtual seat on a front window.

FIG. 3 is a diagram showing an example in which the projection device 242A projects a virtual image VM and a virtual seat VS on the front window 242B. In the example in FIG. 3, the projection device 242A causes the virtual image VM seated in the virtual seat VS to appear on the front window 242B. That is, the virtual image generator 242 causes the virtual image to appear so as to be superimposed on a captured image associated with the seat.

Figure 4:
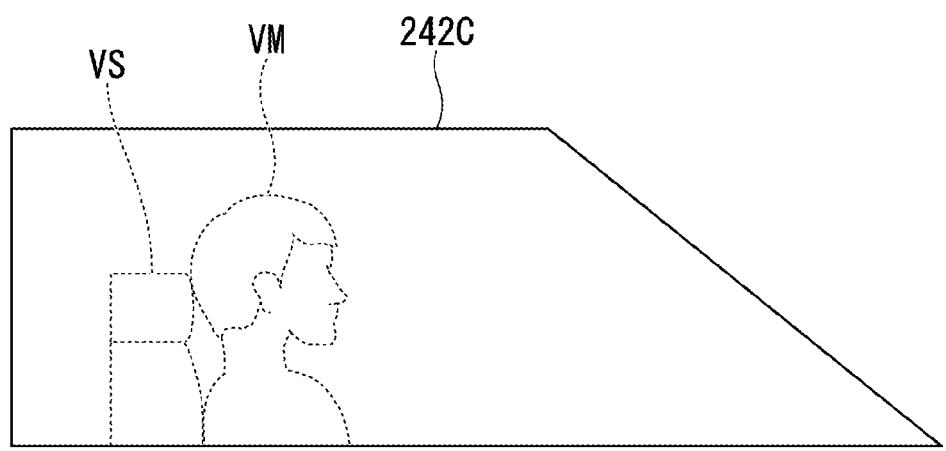
FIG. 4 is a diagram showing an example in which the projection device projects a virtual image and a virtual seat on a left-side window.

FIG. 4 is a diagram showing an example in which the projection device 242A projects a virtual image VM and a virtual seat VS on the left-side window 242C. In the example in FIG. 4, the projection device 242A capable of changing a projection direction by turning in a horizontal direction as represented by the two-way arrow in FIG. 2 causes the virtual image VM seated in the virtual seat VS to appear on the left-side window 242C.

Figure 5:
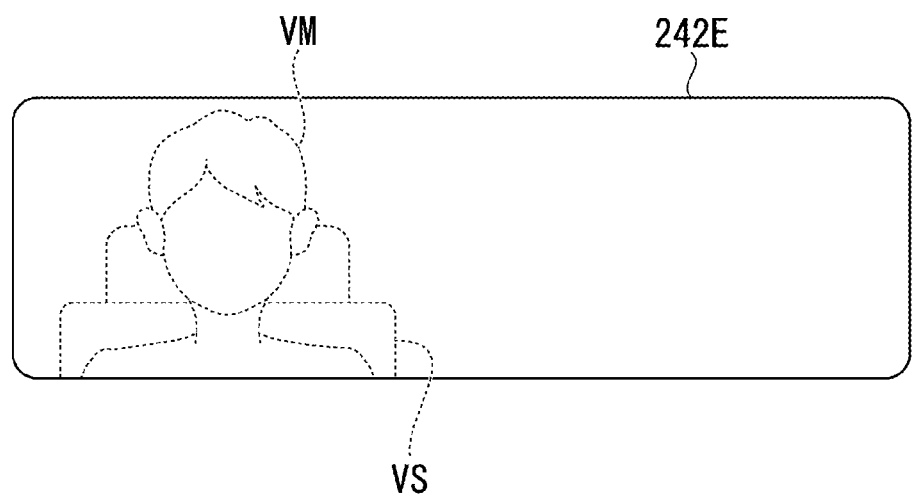
FIG. 5 is a diagram showing an example in which the projection device projects a virtual image and a virtual seat on mirror.

FIG. 5 is a diagram showing an example in which the projection device 242A projects a virtual image VM and a virtual seat VS on the mirror 242E. In the example in FIG. 5, the projection device 242A causes the virtual image VM seated in the virtual seat VS to appear on the mirror 242E.

Figure 6:
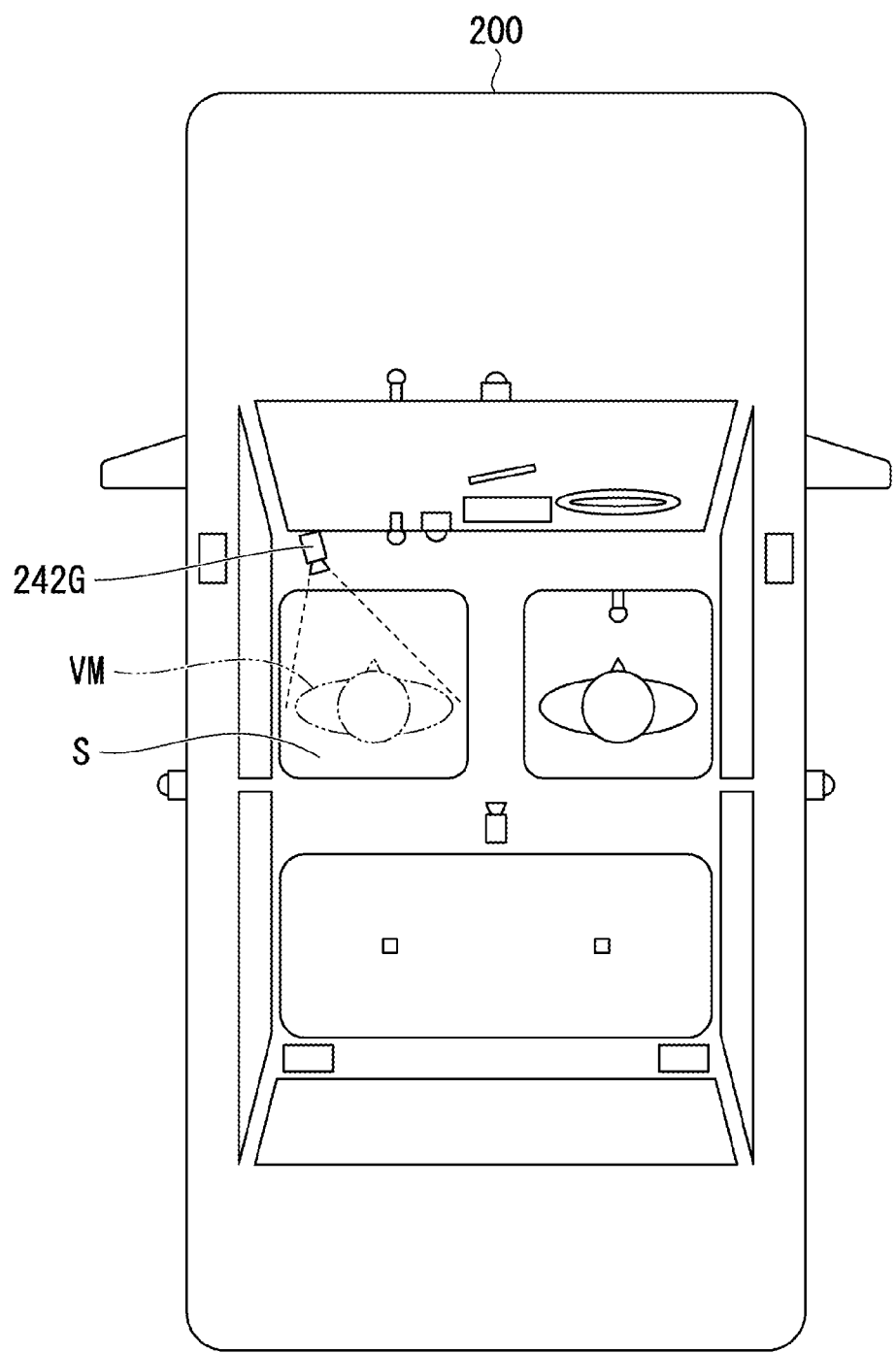
FIG. 6 is a diagram showing an example in which a hologram projecting device projects a virtual image on a vacant seat in a vehicle.

FIG. 6 is a diagram showing an example in which the hologram projection device 242G projects a virtual image VM on a vacant seat S of the vehicle 200. In the example in FIG. 6, the hologram projection device 242G causes the virtual image VM that can be visually recognized by the passenger of the vehicle 200 to appear on the vacant seat S of the vehicle 200.

Figure 7:
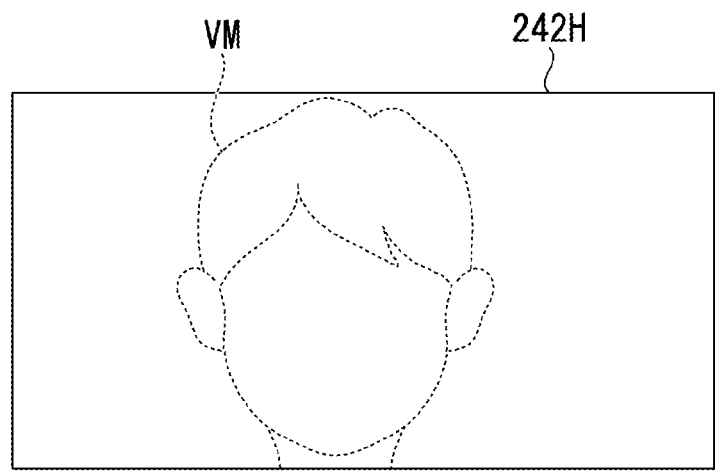
FIG. 7 is a diagram showing an example in which a touch panel-type display displays a face of a virtual image.

Returning to FIG. 2, the touch panel-type display device 242H displays a virtual image on a screen and causes the virtual image that can be visually recognized by the passenger of the vehicle 200 to appear. The touch panel-type display device 242H causes the virtual image with a scale of at least 70% or more, for example, FIG. 7 is a diagram showing an example in which the touch panel-type display 242H displays a face of a virtual image VM. In the example in FIG. 7, the touch panel-type display device 242H causes the face of the virtual image VM to appear on a screen of the touch panel-type display device 242H.

Returning to FIG. 2, the transmission panel-type display 242I is disposed between a driver's seat and a front passenger seat, for example. The transmission panel-type display 242I displays the virtual image on the screen and causes the virtual image that can be visually recognized by the passenger of the vehicle 200 to appear. The transmission panel-type display 242I causes the virtual image to appear with a scale of at least 70% or more, for example. The transmission panel-type display 242I is, for example, a transparent LED display in which LEDs are aligned on a transparent substrate, an organic light emitting diode (OLED) that has a structure of organic electroluminescence (EL) elements, in each of which a laminated film of a functional organic materials is sandwiched with two electrodes, aligned on a transparent substrate, and the like. The transmission panel-type display 242I may be a head-up display-type display that has a projection device and a polarization panel incorporated in a headrest of the driver's seat, for example.

Figure 8:
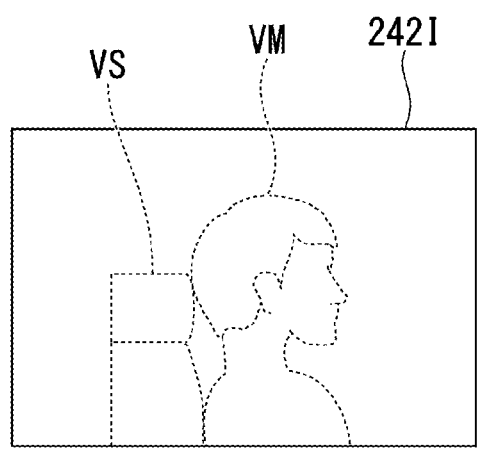
FIG. 8 is a diagram showing an example in which a transparent panel-type display displays a face of a virtual image.

FIG. 8 is a diagram showing an example in which the transmission panel-type display 242I displays a face of a virtual image VM. In the example in FIG. 8, the transmission panel-type display 242I causes the face of the virtual image VM to appear on a screen of the transmission panel-type display 242I. That is, the virtual image generator 242 causes the virtual image to appear so as to associate with a seat mirror image position of the vehicle when seen by the passenger.

In the example in FIG. 2, the sound output section 244 includes a front-left speaker 244A, a front-right speaker 244B, a rear-left speaker 244C, and a rear-right speaker 244D.

The sound input section 250 includes, for example, a singing microphone 250A.

The virtual image selector 260 includes, for example, a touch panel-type display device 242H. The passenger of the vehicle 200 selects a virtual image to be caused to appear by the virtual image generator 242 among a plurality of virtual images of persons by performing a touch input on the touch panel-type display device 242H, for example.

The content selector 270 includes, for example, a touch panel-type display device 242H. The passenger of the vehicle 200 selects desired content among a plurality of items of content that the content providing server 100 can provide, by performing a touch input on the touch panel-type display device 242H, for example.

[Content Providing Server]

The content providing server 100 includes, for example, a communicator 110, a storage 120, and a controller 130. Some or all functional configurations included in the content providing server 100 may be mounted in the vehicle 200. Some or all functional configurations included in the vehicle 200 may be mounted in the content providing server 100.

The communicator 110 is a communication module for establishing connection to the network NW, for example. The communicator 110 includes a network interface card (NIC), for example. The communicator 110 performs communication with the vehicle 200 via the network NW.

The storage 120 is realized by an HDD, a flash memory, a RAM, a ROM, or the like. The storage 120 stores information received from the vehicle 200, information transmitted to the vehicle 200, original data generated by the content providing server 100, and the like. In a case in which the content providing server 100 provides karaoke content to the passenger of the vehicle 200, karaoke content data 122 (for example, data of accompaniment music, lyrics, and the like) is stored in the storage 120.

The controller 130 is realized by a processor such as a central processing unit (CPU) executing a program stored in the storage 120. The controller 130 includes, for example, an original data generator 132 and a singing skill scorer 134.

Some or all of these functional sections may be realized by hardware such as large scale integration (LSI), an application specific integrated circuit (ASIC), a field-programmable gate array (FPGA), or a graphics processing unit (GPU) or may be realized by software and hardware in cooperation. The program may be stored in a storage device such as a hard disk drive (HDD) or a flash memory in advance or may be saved in a detachable storage medium such as a DVD or a CD-ROM and may be installed in the storage device by the storage medium being attached to a drive device.

The original data generator 132 generates original data of content that is obtained by causing the sound (for example, singing, an utterance, and the like of the virtual image) output from the sound output section 244 of the vehicle 200 to be coordinated with actions of the virtual image generated by the virtual image generator 242 of the vehicle 200, for the passenger of the vehicle 200. Therefore, the original data generator 132 includes, for example, an utterance generator 132A, a singing voice generator 132B, and an action generator 132C.

The utterance generator 132A generates original data of an utterance of the virtual image (that is, speech sounds of the virtual image) caused to appear by the virtual image generator 242 of the vehicle 200. The utterance generator 132A includes an artificial intelligence (AI) mounted therein and has an interactive voice response function.

AI uses a computer to artificially realize human intelligence tasks such as learning, estimation, and determination. AI includes machine learning and deep learning. Machine learning is a method using an algorithm for analyzing data on specific phenomena in the world, learning the results, and performing determination and prediction. Deep learning is a method of implementing machine learning. Deep learning can classify tasks through a method that enables (or that can expect) various kinds of support using a machine. Machine learning and deep learning are technologies for learning using AI. Developers do not program all actions in advance, and machine learning is characterized in that the AI itself analyzes data and finds natural laws and rules. That is, machine learning can execute specific tasks of the AI through training. Deep learning is achieved by further expanding machine learning. A framework used for analyzing information and data in deep learning is different from that in machine learning. In deep learning, an ability of the computer to analyze and learn from data is improved by using a neural network with a multilayer structure produced made to resemble human nerves.

The interactive voice response function is a function of responding to an utterance of the passenger of the vehicle 200 using sound recorded in advance or sound that is dynamically generated.

The utterance generator 132A generates original data of an utterance of the virtual image on the basis of the utterance of the passenger of the vehicle 200 detected by the passenger information detector 220 of the vehicle 200 and establishes communication between the passenger of the vehicle 200 and the virtual image.

The utterance generator 132A may generate original data of an utterance of the virtual image on the basis of information outside the vehicle 200 detected by the outside information detector 230 of the vehicle 200. For example, the utterance generator 132A generates original data of the utterance of the virtual image in regard to a detection result (for example, the fact that it has started to rain, a road has started to become crowded, and the like) of the outside information detector 230. In this case, the detection ability of the outside information detector 230 is set to be similar to the ability of the passenger to detect the information outside the vehicle 200. As a result, the utterance generator 132A can generate original data of an utterance of the virtual image from which empathy of the passenger can be obtained. For example, the utterance generator 132A generates the original data of the utterance of the virtual image on the basis of information only in a direction in which the virtual image is directed. In a case in which a viewable range of the passenger is narrowed due to moving of the vehicle 200 or visibility is degraded due to bad weather, for example, the detection ability of the outside information detector 230 is reduced with a decrease in the ability of the passenger to detect information outside the vehicle 200.

The outside information detector 230 detects that it has started to rain using the technology disclosed in PCT International Publication No. WO2014/007175. In this case, if there are locations with higher luminance than the surroundings at substantially the same positions for predetermined periods of time or more in an image captured by the outside-vehicle camera 230A regardless of a background flowing backward during traveling of the vehicle 200, for example, the outside information detector 230 determines that the locations associate with water droplets adhering to a lens of the outside-vehicle camera 230A and detects that it has started to rain. The outside information detector 230 transmits data indicating that it has started to rain to the utterance generator 132A of the content providing server 100 via the network NW.

The outside information detector 230 detects that a road has started to become crowded using the technology disclosed in FIG. 7 of Japanese Unexamined Patent Application, First Publication No. H11-064031. In this example, the outside information detector 230 detects the current position of the vehicle 200 using a GNSS receiver, a gyro sensor, and a vehicle speed sensor. The vehicle speed sensor detects a vehicle speed of the vehicle 200. The gyro sensor detects a traveling direction of the vehicle 200. The outside information detector 230 determines that the road has started to become crowded if a state in which the vehicle speed of the vehicle 200 is a predetermined value or less has continued for a predetermined period of time or more. The outside information detector 230 transmits data indicating that the road has started to become crowded to the utterance generator 132A of the content providing server 100 via the network NW.

The utterance generator 132A may generate original data of an utterance of the virtual image in regard to a tourist place outside the car, for example, detected by the outside information detector 230. In this example, the outside information detector 230 has a navigation device provided with map information including tourist places and a GNSS receiver. The outside information detector 230 detects that the vehicle 200 is located near a tourist place using the technology disclosed in Japanese Patent No. 5921162, for example. The outside information detector 230 transmits data indicating that the vehicle 200 is located at a tourist place to the utterance generator 132A of the content providing server 100 via a network. The storage 120 of the content providing server 100 stores tour information of each of a plurality of tourist places and scenarios of an utterance of the virtual image in regard to each tourist place. The utterance generator 132A generates original data of an utterance of the virtual image in regard to the tourist places on the basis of the scenarios stored in the storage 120.

Figure 9:
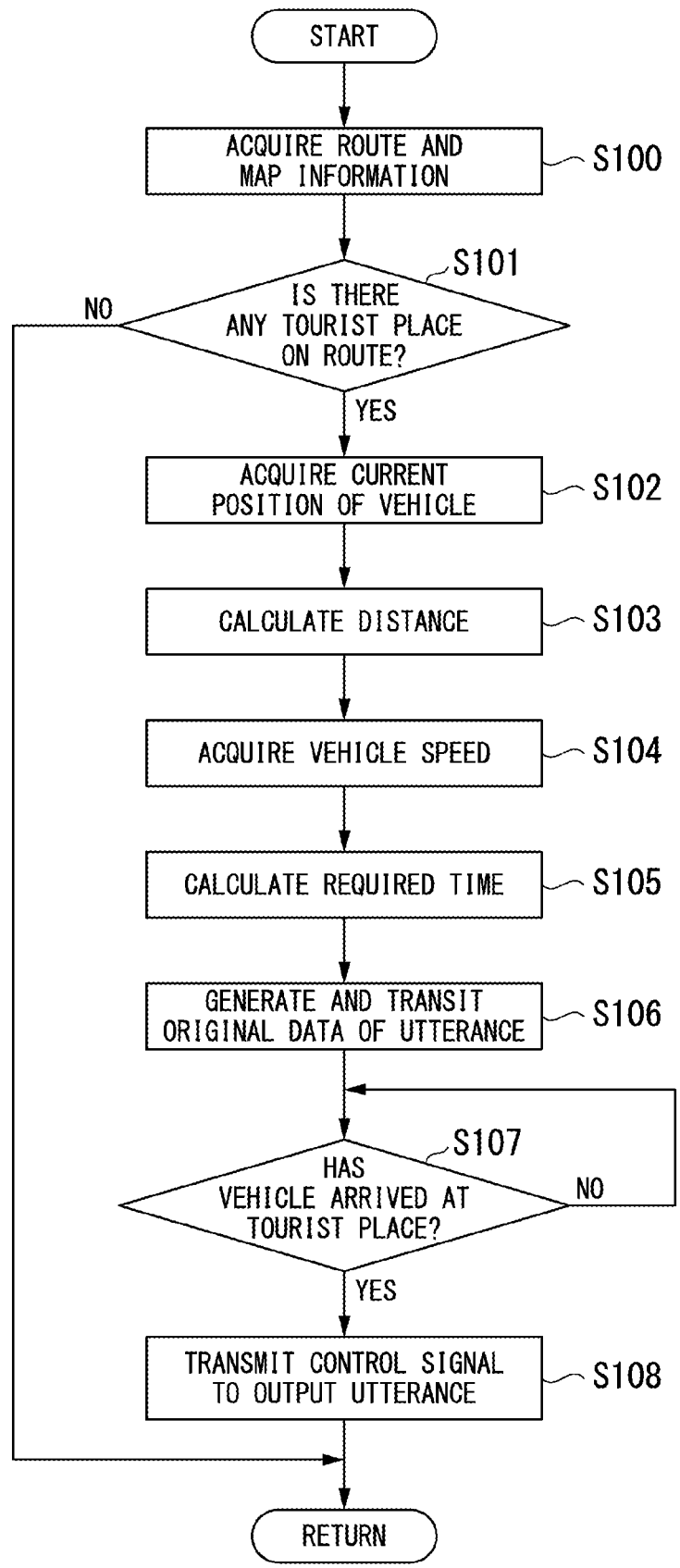

FIG. 9 is a flowchart showing an example of a flow of processing in which the utterance generator 132A generates original data of an utterance of the virtual image in regard to a tourist place. First, the controller 130 of the content providing server 100 acquire a route of the vehicle 200 decided by the navigation device of the outside information detector 230 in the vehicle 200 and the map information provided in the navigation device via the network NW (Step S100). The controller 130 determines whether or not there is a tourist place on the acquired route of the vehicle 200 (Step S101). In a case in which there is no tourist place on the route of the vehicle 200, routine processing of the flowchart ends. Meanwhile, in a case in which there is a tourist place on the route of the vehicle 200, the controller 130 acquires the current position of the vehicle 200 detected by the GNSS receiver of the navigation device via the network NW (Step S102). The controller 130 calculates a distance between the current position of the vehicle 200 and the tourist place (Step S103). The controller 130 acquires a vehicle speed of the vehicle 200 detected by the vehicle speed sensor of the outside information detector 230 via the network NW (Step S104). The controller 130 calculates a required time for the vehicle 200 to arrive at the tourist place on the basis of the distance and the vehicle speed (Step S105). The utterance generator 132A of the content providing server 100 generates original data of an utterance of the virtual image in regard to the tourist place and transmits the original data to the sound output section 244 of the vehicle 200 via the network NW (Step S106). The controller 130 determines whether or not the vehicle 200 has arrived at the tourist place (Step S107). In a case in which the vehicle 200 has not arrived at the tourist place, the controller 130 executes Step S107 again after elapse of a predetermined period of time. Meanwhile, in a case in which the vehicle 200 has arrived at the tourist place, the controller 130 transmits a control signal for causing the sound output section 244 of the vehicle 200 to output an utterance of the virtual image in regard to the tourist place to the sound output section 244 via the network NW (Step S108). In this manner, the controller 130 adjusts a timing at which the sound output section 244 is caused to output the utterance on the basis of a situation outside the vehicle.

The utterance generator 132A may generate original data of an utterance of the virtual image in regard to an advertisement outside the vehicle, for example, detected by the outside information detector 230. In this example, the storage 280 of the vehicle 200 stores dictionary data. The outside information detector 230 recognizes character sequences included in images captured by the outside-vehicle cameras 230A to 230C using the technology disclosed in Japanese Unexamined Patent Application, First Publication No. 2015-153032, for example. Specifically, the outside information detector 230 recognizes character sequences included in the images using optical character recognition (OCR). The recognized character sequences are translated according to the technology disclosed in Japanese Unexamined Patent Application, First Publication No. 2015-153032, and the outside information detector 230 determines whether or not the recognized character sequences indicate an advertisement on the basis of the dictionary data stored in the storage 280. In a case in which the recognized character sequences indicate an advertisement, the outside information detector 230 transmits data indicating the advertisement to the utterance generator 132A of the content providing server 100 via the network NW. The storage 120 of the content providing server 100 stores scenarios of an utterance of the virtual image in regard to each of a plurality of advertisement items. The utterance generator 132A generates original data of an utterance of the virtual image in regard to an advertisement on the basis of the scenarios stored in the storage 120.

A case in which the content providing server 100 provides karaoke content to the passenger of the vehicle 200 but the passenger of the vehicle 200 does not sing along with accompanying music of the karaoke content is conceivable. In this case, the utterance generator 132A may generate original data of an utterance of the virtual image for encouraging the passenger of the vehicle 200 to sing on the basis of the detection result of the sound input section 250 of the vehicle 200 indicating that the passenger of the vehicle 200 is not singing along with the accompanying music of the karaoke content. In this example, a singing voice of the passenger of the vehicle 200 detected by the singing microphone of the sound input section 250 is transmitted to the controller 130 of the content providing server 100 via the network NW.

The controller 130 determines whether or not the passenger of the vehicle 200 is singing along with the accompanying music on the basis of the received singing voice (specifically, no sound, since the passenger is not singing) of the passenger of the vehicle 200 and the accompanying music of the karaoke content data 122. The storage 120 of the content providing server 100 stores scenarios of an utterance of the virtual image for encouraging the passenger of the vehicle 200 to sing. In a case in which the passenger of the vehicle 200 is not singing along with the accompanying music, the utterance generator 132A generates original data of an utterance of the virtual image for encouraging the passenger of the vehicle 200 on the basis of the scenarios stored in the storage 120. In a case in which the passenger of the vehicle 200 is not singing along with the accompanying music, the utterance generator 132A may generate original data of an interlude (a call or a clapping sound) of the virtual image in accordance with the accompanying music. In a case in which the utterance generator 132A generates original data of a clapping sound of the virtual image, the action generator 132C may generate original data of a clapping action of the virtual image in accordance with the clapping sound.

Figure 10:
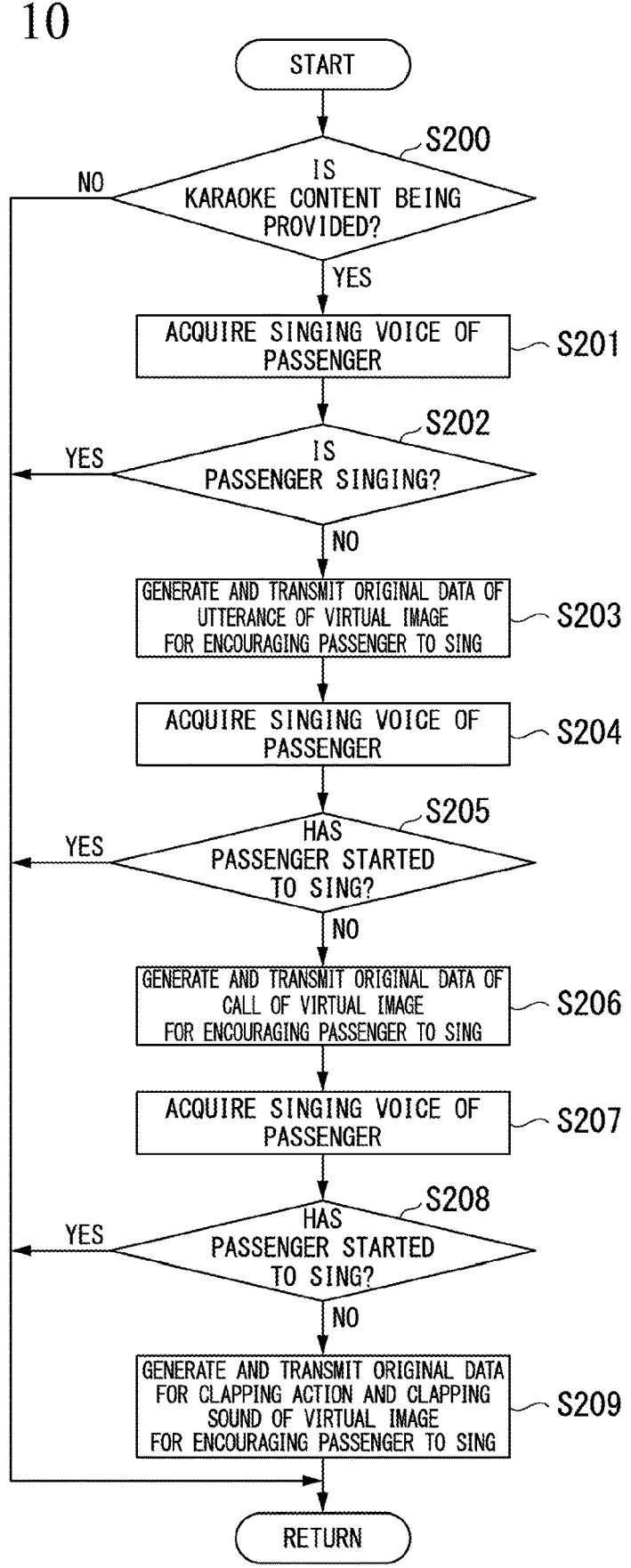
FIG. 10 is a flowchart showing an example of a flow of processing in which the utterance generator generates original data of utterance of a virtual image for encouraging a passenger of the vehicle to sing a song.

FIG. 10 is a flowchart showing an example of a flow of processing in which the utterance generator 132A generates original data of an utterance of the virtual image for encouraging the passenger of the vehicle 200 to sing, and the like. First, the controller 130 of the content providing server 100 determines whether or not the content providing server 100 is providing karaoke content to the passenger of the vehicle 200 (Step S200). In a case in which the content providing server 100 is not providing karaoke content, routine processing of the flowchart ends. Meanwhile, in a case in which the content providing server 100 is providing karaoke content, the controller 130 acquires a singing voice of the passenger of the vehicle 200 detected by the singing microphone of the sound input section 250 of the vehicle 200 (Step S201). The controller 130 determines whether or not the passenger of the vehicle 200 is singing (Step S202). In a case in which the passenger of the vehicle 200 is singing, routine processing of the flowchart ends. Meanwhile, in a case in which the passenger of the vehicle 200 is not singing, the utterance generator 132A of the content providing server 100 generates original data of an utterance of the virtual image for encouraging the passenger of the vehicle 200 to sing and transmits the original data to the sound output section 244 of the vehicle 200 via the network NW (Step S203). The controller 130 acquires a singing voice of the passenger of the vehicle 200 (Step S204). The controller 130 determines whether or not the passenger of the vehicle 200 has started to sing (Step S205). In a case in which the passenger of the vehicle 200 has started to sing, routine processing of the flowchart ends. Meanwhile, in a case in which the passenger of the vehicle 200 has not started to sing, the utterance generator 132A generates original data for a call of the virtual image for encouraging the passenger of the vehicle 200 to sing and transmits the original data to the sound output section 244 of the vehicle 200 via the network NW (Step S206). The controller 130 acquires a singing voice of the passenger of the vehicle 200 (Step S207). The controller 130 determines whether or not the passenger of the vehicle 200 has started to sing (Step S208). In a case in which the passenger of the vehicle 200 has started to sing, routine processing of the flowchart ends. Meanwhile, in a case in which the passenger of the vehicle 200 has not started to sing, the action generator 132C generates original data for a clapping action of the virtual image for encouraging the passenger of the vehicle 200 to sing, and the utterance generator 132A generates original data for a clapping sound of the virtual image and transmits the original data to the virtual image generator 242 and the sound output section 244 of the vehicle 200 via the network NW (Step S209).

The singing voice generator 132B generates original data of a singing voice of the virtual image output from the sound output section 244 of the vehicle 200. In a case in which the content providing server 100 provides karaoke content to the passenger of the vehicle 200, the singing voice generator 132B may generate original data of the singing voice of the virtual image that sings along with accompanying music of the karaoke content output from the sound output section 244 of the vehicle 200. In this example, the original data of the singing voice of the virtual image is generated using the technology disclosed in Japanese Unexamined Patent Application, First Publication No. 2008-58379. The singing voice generator 132B is a concatenative or corpus-based text-to-speech (TTS) system that records pronunciations of actual people, decomposes the pronunciations into sound elements to produce a database, synthesizes the sound elements in the database, and generates desired sounds. The singing voice generator 132B may be a parametric TTS system.

In a case in which the passenger of the vehicle 200 does not start to sing even though the singing voice generator 132B of the content providing server 100 generates the original data of the singing voice of the virtual image and the sound output section 244 of the vehicle 200 outputs the singing voice of the virtual image, the controller 130 of the content providing server 100 may stop the transmission of the original data of the singing voice of the virtual image to the sound output section 244 of the vehicle 200. In that case, the utterance generator 132A may generate original data of an utterance of the virtual image for the passenger of the vehicle 200 instead of the generation of the original data for the singing voice of the virtual image using the singing voice generator 132B, and the sound output section 244 of the vehicle 200 may output the utterance of the virtual image to the passenger of the vehicle 200.

The action generator 132C generates original data of an action of the virtual image caused to appear by the virtual image generator 242 of the vehicle 200. As described above, the action of the virtual image caused to appear by the virtual image generator 242 is coordinated with an utterance and/or singing voice of the virtual image using MMD, for example.

In a case in which the content providing server 100 provides karaoke content to the passenger of the vehicle 200, an action of the virtual image caused to appear by the virtual image generator 242 on the basis of the original data generated by the action generator 132C is coordinated with accompanying music of the karaoke content.

For example, in a case in which a facial expression and the like of the passenger detected by the passenger information detector 220 of the vehicle 200 and/or a scene or the like outside the vehicle detected by the outside information detector 230 change, for example, the utterance generator 132A may generate original data such that an utterance of the virtual image output from the sound output section 244 dynamically changes, and also, the action generator 132C may generate original data such that actions of the virtual image generated by the virtual image generator 242 dynamically change, in accordance with the changes in facial expression and/or the scene. That is, in this example, the utterance generator 132A and the action generator 132C generate original data on the basis of the latest information without causing the information detected by the passenger information detector 220 and the outside information detector 230 to be accumulated in the storage 120. For example, the passenger information processor 410 may include a storage (a storage device or an information storage region). In the storage, states of the passenger of the vehicle in response to interactions provided by the provider 240, which have been detected by the passenger information processor 410, are stored. The provider 240 may change the interaction that the passenger of the vehicle can use on the basis of the aforementioned states in the storage. For example, the provider 240 may change the interaction on the basis of information of associating a state of the passenger of the vehicle with an interaction, which is information stored in the storage 280. The interaction may be changed by the original data generator 132. In this case, the original data generator 132 changes the interaction on the basis of information associating a state of the passenger of the vehicle with an interaction, which is information stored in the storage 120.

The sound output section 244 of the vehicle 200 outputs an utterance and singing voice of the virtual image on the basis of the original data generated by the utterance generator 132A and the singing voice generator 132B. The virtual image generator 242 of the vehicle 200 causes the virtual image acting on the basis of the original data generated by the action generator 132C to appear. It is possible to allow the passenger of the vehicle 200 to feel as if the virtual image were also in the vehicle 200 by causing the virtual image that can dynamically change an utterance and actions to appear.

In a case in which the content providing server 100 provides karaoke content to the passenger of the vehicle 200, the singing skill scorer 134 scores singing skills of the passenger of the vehicle 200 who sings along with accompanying music of the karaoke content. The virtual image generator 242 of the vehicle 200 raises the grade of virtual images that the passenger of the vehicle 200 can select through the virtual image selector 260 when the result of the scoring by the singing skill scorer 134 is higher.

Figure 11:
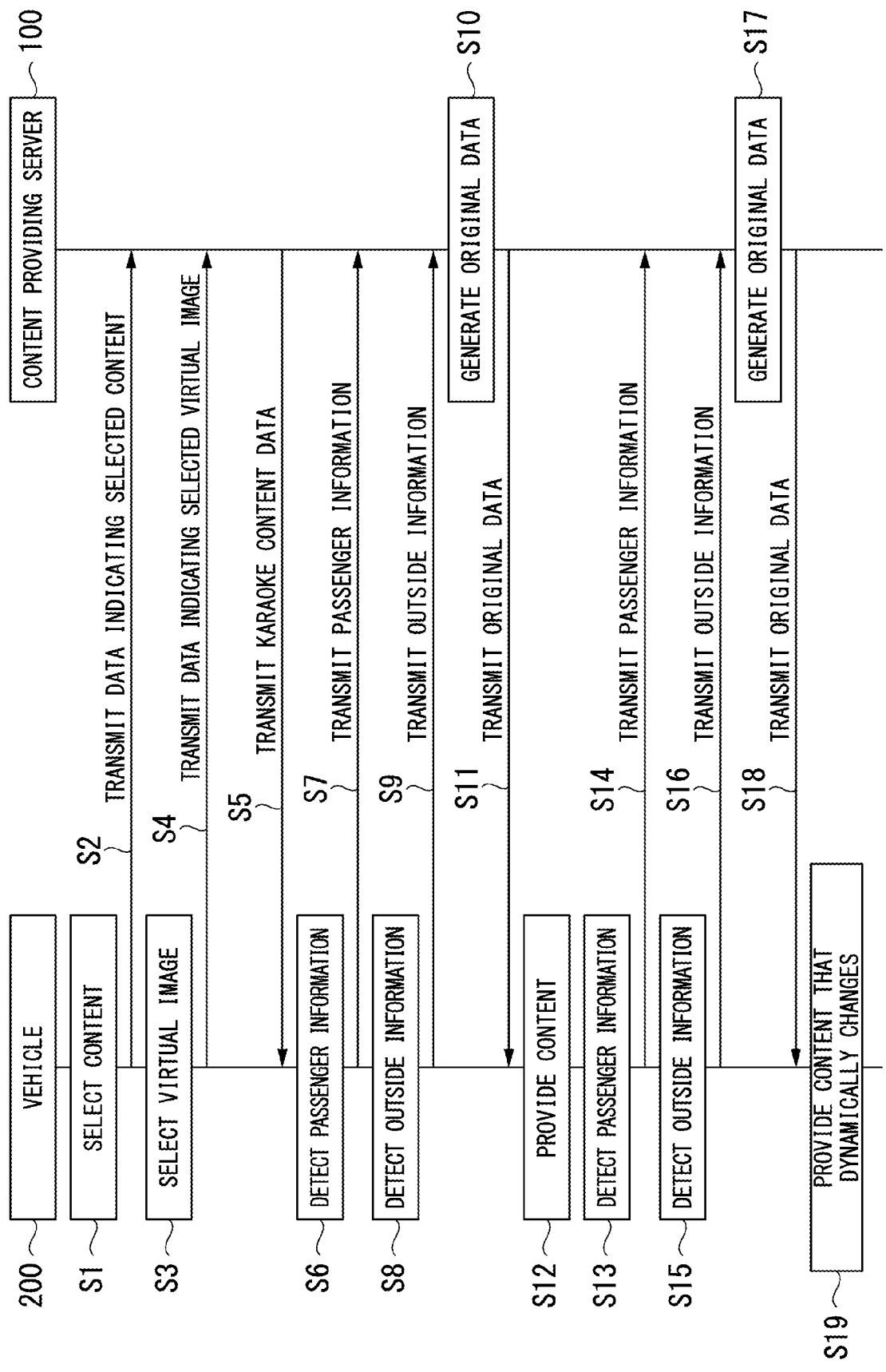
FIG. 11 is a sequence diagram showing an example of processing performed by an experience providing server and the vehicle.

FIG. 11 is a sequence diagram showing an example of processing performed by the content providing server 100 and the vehicle 200.

(Step S1) The content selector 270 of the vehicle 200 receives selection of content from the passenger of the vehicle 200.

(Step S2) The vehicle 200 transmits data indicating the selected content (karaoke content in this example) to the content providing server 100.

(Step S3) The virtual image selector 260 of the vehicle 200 receives selection of a virtual image by the passenger of the vehicle 200.

(Step S4) The vehicle 200 transmits data indicating the selected virtual image to the content providing server 100.

(Step S5) The content providing server 100 transmits data such as an accompanying music, lyrics, and the like of the karaoke content to the vehicle 200.

(Step S6) The passenger information detector 220 of the vehicle 200 detects information regarding the passenger of the vehicle 200.

(Step S7) The vehicle 200 transmits the detected information regarding the passenger of the vehicle 200 to the content providing server 100.

(Step S8) The outside information detector 230 of the vehicle 200 detects information outside the vehicle 200.

(Step S9) The vehicle 200 transmits the detected information outside the vehicle 200 to the content providing server 100.

(Step S10) The utterance generator 132A of the content providing server 100 generates original data to be used by the sound output section 244 of the vehicle 200 to output utterance of the virtual image on the basis of the information regarding the passenger of the vehicle 200 and the information outside the vehicle 200. The singing voice generator 132B generates original data to be used by the sound output section 244 of the vehicle 200 to output singing voice of the virtual image. The action generator 132C generates original data to be used by the virtual image generator 242 of the vehicle 200 to generate actions of the virtual image.

(Step S11) The content providing server 100 transmits the generated original data to the vehicle 200.

(Step S12) The provider 240 of the vehicle 200 provides content in which actions of the virtual image is coordinated with sound (utterance, singing voice, and the like of the virtual image) to the passenger of the vehicle 200.

(Step S13) The passenger information detector 220 of the vehicle 200 detects information regarding the passenger of the vehicle 200 while the content is being provided. The information indicates a reaction of the passenger of the vehicle 200 to the provided content.

(Step S14) The vehicle 200 transmits the information regarding the passenger of the vehicle 200 detected while the content is being provided to the content providing server 100.

(Step S15) The outside information detector 230 of the vehicle 200 detects information outside the vehicle 200 while the content is being provided.

(Step S16) The vehicle 200 transmits the information outside the vehicle 200 detected while the content is being provided to the content providing server 100.

(Step S17) The utterance generator 132A generates original data to be used for outputting the utterance of the virtual image, the singing voice generator 132B generates original data to be used for outputting singing voice of the virtual image, and the action generator 132C generates original data to be used for generating actions of the virtual image, on the basis of the information regarding the passenger of the vehicle 200 and the information outside the vehicle 200 while the content is being provided.

(Step S18) The content providing server 100 transmits the generated original data to the vehicle 200.

(Step S19) The provider 240 of the vehicle 200 provides content in which the utterance, the singing voice, and the actions of the virtual image dynamically change to the passenger of the vehicle 200 on the basis of the original data generated while the content is being provided.

The vehicle 200 that the passenger who is provided with the content is boarding is an automated driving vehicle that basically does not require driving operations, for example. The following description will be given on the assumption that the vehicle 200 that the passenger who is provided with content is boarding is an automated driving vehicle. The vehicle 200 that the passenger who is provided with content is boarding may be a non-automated driving vehicle.

[Automated Driving Vehicle]

Figure 12:
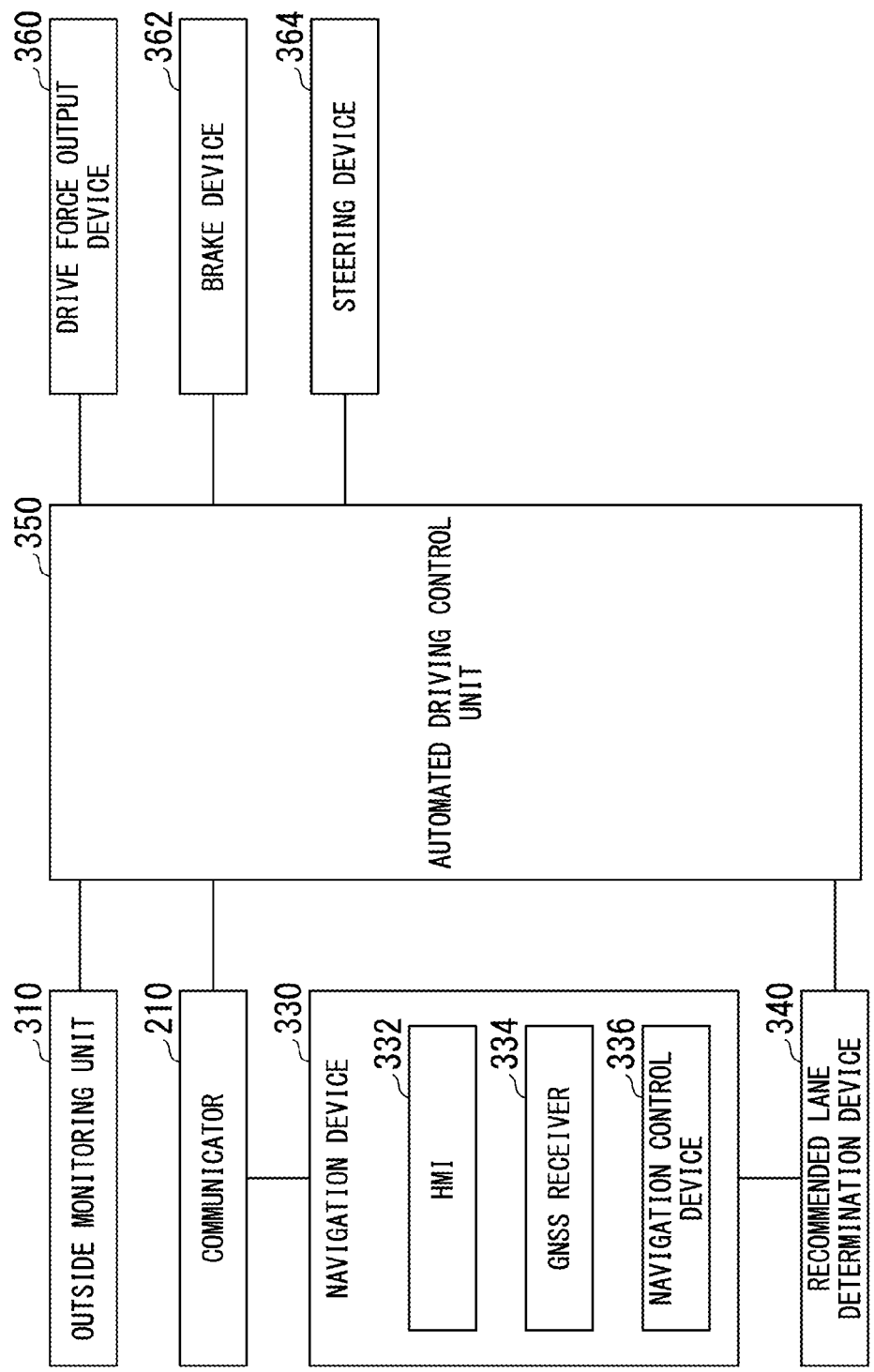
FIG. 12 is a configuration diagram of the vehicle provided with an automated driving function.

FIG. 12 is a configuration diagram of the vehicle 200 provided with an automated driving function. The vehicle 200 includes, for example, an outside monitoring unit 310, a navigation device 330, a recommended lane determination device 340, an automated driving control unit 350, a drive force output device 360, a brake device 362, and a steering device 364 in addition to the components (the communicator 210, the passenger information detector 220, the outside information detector 230, the provider 240, the sound input section 250, the virtual image selector 260, and the storage 280) shown in FIG. 1.

The outside monitoring unit 310 includes, for example, a camera, a radar, a light detection and ranging (LIDAR), and an object recognition device that performs sensor fusion processing on the basis of outputs therefrom. The outside monitoring unit 310 estimates types of objects (particularly, vehicles, pedestrians, and bicycles) that are present in the surroundings of the vehicle 200 and outputs the estimated types along with information regarding the positions and the speeds thereof to the automated driving control unit 350. A part of components may be shared between the outside monitoring unit 310 and the outside information detector 230.

The navigation device 330 includes, for example, a human machine interface (HMI) 332, a GNSS receiver 334, and a navigation control device 336. The HMI 332 includes, for example, a touch panel-type display device, a speaker, a microphone, and the like. The GNSS receiver 334 measures the position of the GNSS receiver 334 itself (the position of the vehicle 200) on the basis of radio waves that arrives from a GNSS satellite (a GPS satellite, for example). The navigation control device 336 includes, for example, a central processing unit (CPU) and various storage devices and controls the entire navigation device 330. Map information (navigation map) is stored in the storage device. The navigation map is a map that expresses roads with nodes and links. The navigation control device 336 decides a route from the position of the vehicle 200 measured by the GNSS receiver 334 to a destination designated using the HMI 332 with reference to the navigation map. The navigation control device 336 may transmit the position of the vehicle 200 and the destination to a navigation server (not shown) using the communicator 210 and acquire a route replied from the navigation server. A part of components may be shared between the navigation device 330 and the outside information detector 230. That is, the navigation device provided in the outside information detector 230 and the navigation device 330 may be a shared navigation device.

The recommended lane determination device 340 includes, for example, a map positioning unit (MPU) and various storage devices. The storage devices store more detailed and highly fine map information than the navigation map. The highly fine map information includes information such as a road width, a gradient, a curvature, signal positions, and the like of each lane, for example. The recommended lane determination device 340 determines a recommended lane that is preferable for traveling along the route input from the navigation device 330 and outputs the recommended lane to the automated driving control unit 350.

The automated driving control unit 350 includes one or more processors such as a CPU and a micro processing unit (MPU) and various storage devices. The automated driving control unit 350 causes the vehicle 200 to automatically travel so as to avoid contact with objects, the positions and the speeds of which have been input from the outside monitoring unit 310, on the basis of a principle that the vehicle 200 travels along the recommended lane determined by the recommended lane determination device 340. The automated driving control unit 350 sequentially executes various events, for example. The events include a constant-speed traveling event of traveling along the same traveling lane at a constant speed, a following traveling event of following a vehicle traveling ahead, a lane changing event, an interflowing event, a branching event, an emergency stop event, a toll gate event of passing through a toll gate, and a handover event of ending automated driving and switching it to non-automated driving. There is also a case in which actions for avoidance are planned on the basis of a situation in the surroundings of the vehicle 200 (presence of vehicles and pedestrians in the surroundings, narrowing of the lane due to road construction, or the like) during execution of such an event.

The automated driving control unit 350 generates a target trajectory along which the vehicle 200 travels in the future. The target trajectory includes, for example, a speed element. For example, the target trajectory is expressed as points (trajectory points) at which the vehicle is to arrive being aligned in order. The trajectory points are points at which the vehicle is to arrive at each predetermined traveling distance, and separately from these, a target speed and a target acceleration for each sampling time (for example, about 0 and several split seconds) are generated as a part of the target trajectory. Each trajectory point may be a position at which the vehicle is to arrive at a sampling clock time for each predetermined sampling time. In this case, information of the target speed and the target acceleration is expressed as intervals of the trajectory points.

Figure 13:
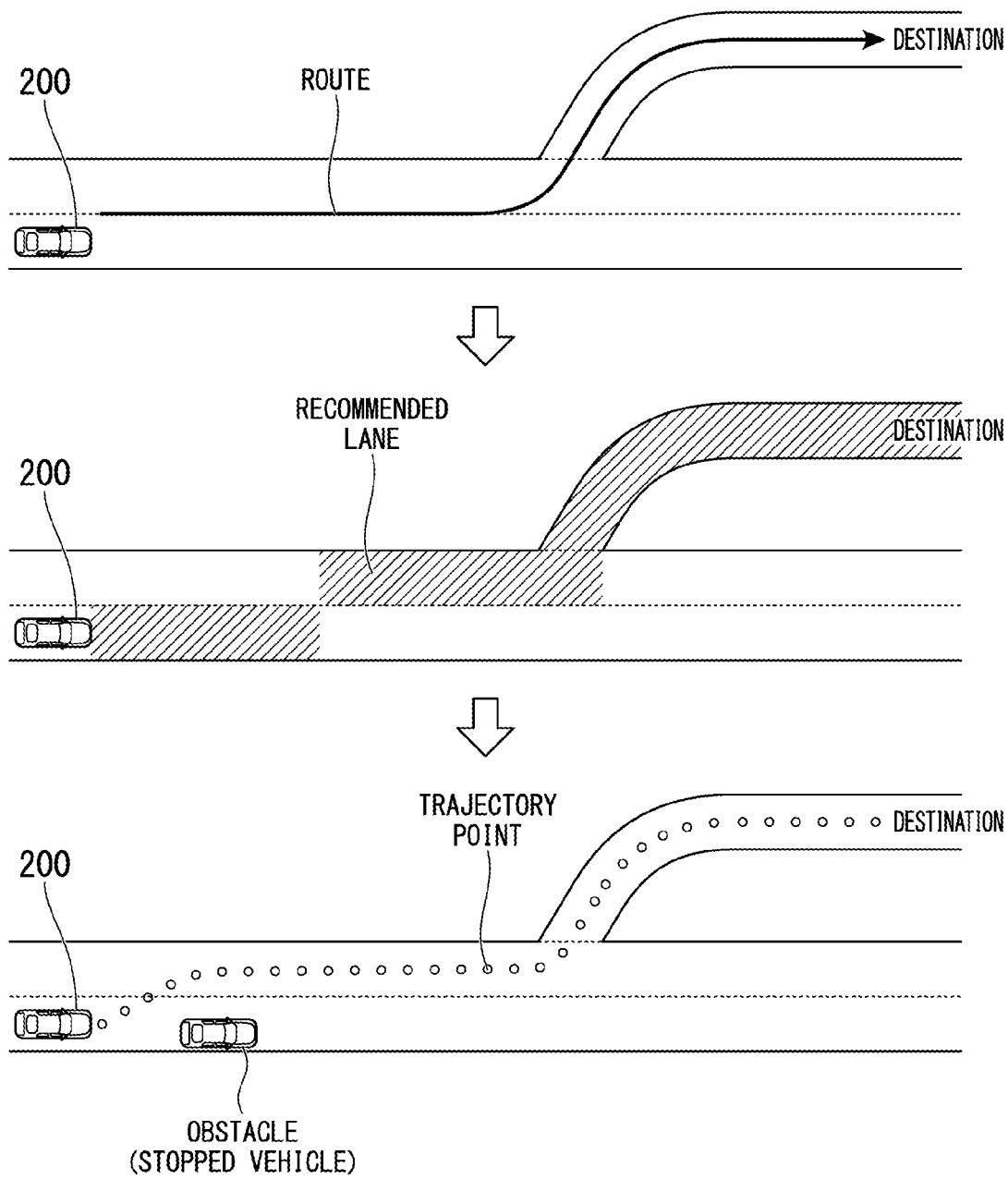
FIG. 13 is a diagram showing a process of processing for automated driving.

FIG. 13 is a diagram showing a process of processing for automated driving. First, a route is determined by the navigation device 330 as shown in the upper diagram. The route is a rough route with no distinction of lanes, for example. Next, the recommended lane determination device 340 determines a recommended lane through which the vehicle easily travels along the route as shown in the middle drawing. Then, the automated driving control unit 350 generates trajectory points for the vehicle traveling along the recommended lane to the maximum extent while avoiding obstacles, and controls a part or all of the drive force output device 360, the brake device 362, and the steering device 364 such that the vehicle travels along the trajectory points (and an accompanying speed profile), as shown in the lower diagram. Such assigned tasks are just an example, and the automated driving control unit 350 may centrally perform the processing, for example.

The drive force output device 360 outputs a traveling drive force (torque) for the vehicle to travel to drive wheels. The drive force output device 360 includes, for example, a combination of an internal combustion engine, a motor, a transmission, and the like and a power ECU that controls these components. The power ECU controls the aforementioned configurations in accordance with information input from the automated driving control unit 350 and information input from a driving operator, which is not shown in the drawing.

The brake device 362 includes, for example, a brake caliper, a cylinder that delivers an oil pressure to the brake caliper, an electric motor that generates an oil pressure in the cylinder, and a brake ECU. The brake ECU controls the electric motor in accordance with information input from the automated driving control unit 350 and information input from the driving operator and causes a brake torque in accordance with a braking operation to be output to each wheel. The brake device 362 may include, as a backup, a mechanism for delivering the oil pressure generated through an operation of a brake pedal included in the driving operator to the cylinder via a master cylinder. The brake device 362 is not limited to the aforementioned configuration and may be an electronic control hydraulic brake device that controls an actuator in accordance with information input from the automated driving control unit 350 and delivers the oil pressure in the master cylinder to the cylinder.

The steering device 364 includes, for example, a steering ECU and an electric motor. The electric motor causes a force to act on a rack-and-pinion mechanism and changes a direction of a steered wheel, for example. The steering ECU drives the electric motor and causes the direction of the steered wheel to be changed in accordance with information input from the automated driving control unit 350 or information input from the driving operator.

The provider 240 of the vehicle 200 provides, to the passenger of the vehicle 200, content in which sound output from the sound output section 244 is synchronized (or coordinated) with actions of the virtual image caused to appear by the virtual image generator 242 during the automated driving of the vehicle 200. The provider 240 does not provide content to the passenger of the vehicle 200 during non-automated driving of the vehicle 200. For example, the provider 240 of the vehicle 200 acquires information indicating whether or not automated driving is being performed from the automated driving control unit 350 or the controller of the vehicle and restricts at least some action forms of interactions during non-automated driving of the vehicle 200. The restricted action forms are action forms with probability that may interrupt attention of a driver.

Although the provider 240, the virtual image generator 242, the sound output section 244, and the content player 246 are provided in the vehicle 200, and the original data generator 132, the utterance generator 132A, the singing voice generator 132B, and the action generator 132C are provided in the content providing server 100 (that is, outside the vehicle) in the aforementioned embodiment, these may be provided only in the vehicle 200 or only outside the vehicle.

Modification Examples

Figure 14:
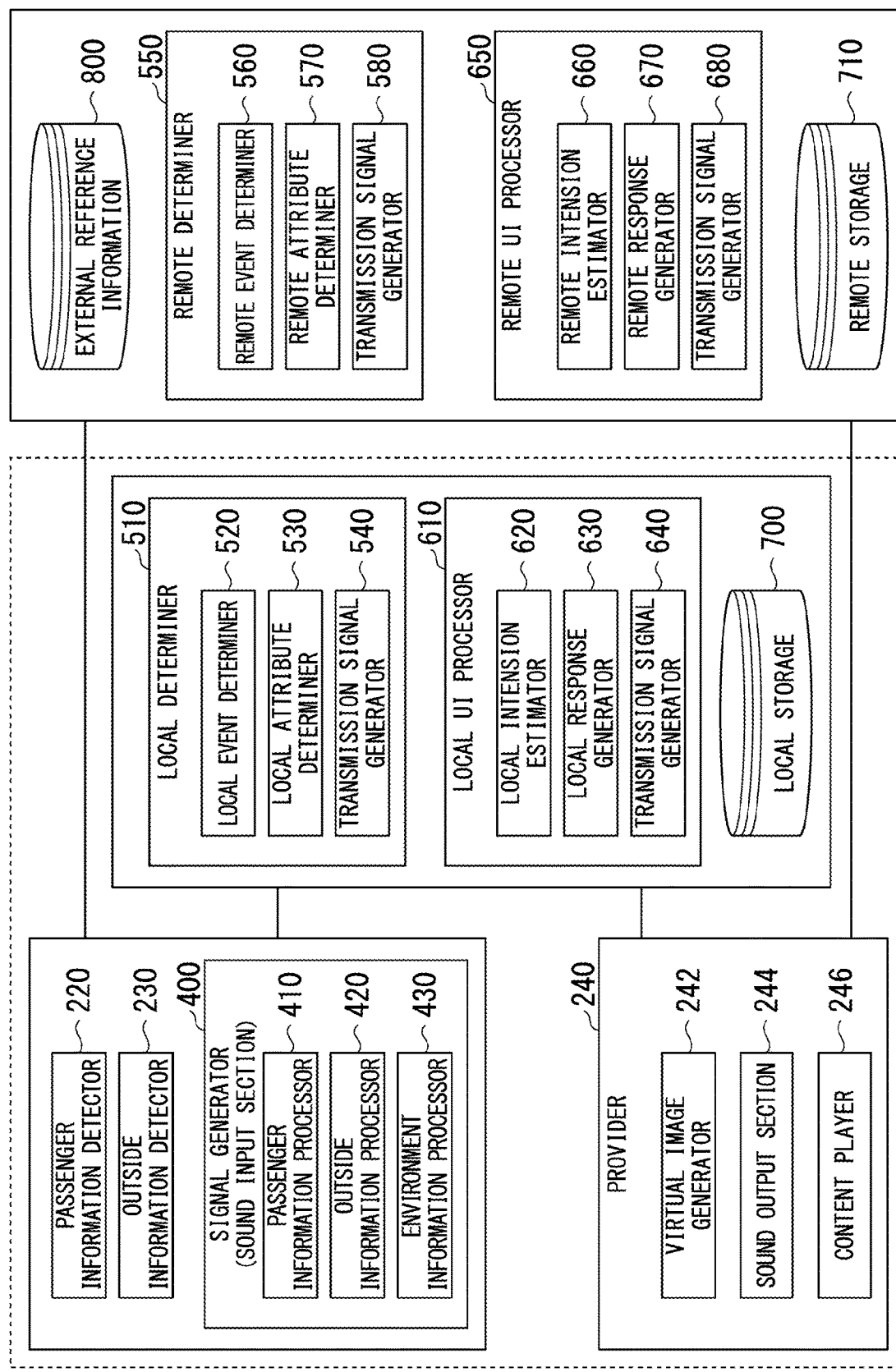
FIG. 14 is a diagram showing an example of a functional configuration included in an experience providing system 1A.

Details of functional configurations and processing of the aforementioned embodiment will be described in modification examples. FIG. 14 is a diagram showing an example of functional configurations included in an experience providing system 1A. The experience providing system 1 includes functional configurations shown in FIG. 14 in addition to the functional configurations in FIGS. 2 and 12. A passenger information detector 220, an outside information detector 230, and a provider 240 in FIG. 13 are functional configurations that are similar to the passenger information detector 220, the outside information detector 230, and the provider 240 described above with reference to FIG. 2.

A vehicle 200 further includes, for example, a signal generator 400, a local determiner 510, a local UI processor 610, and a local storage 700. The signal generator 400 includes the following functional configurations in addition to the functional configurations of the sound input section 250. The signal generator 400 includes, for example, a passenger information processor 410, an outside information processor 420, and an environment information processor 430.

The passenger information processor 410 cut information used by a local determiner 510 or a remote determiner 550 from a detection result of the passenger information detector 220 and transmits the cut information to the local determiner 510 or the remote determiner 550. For example, the passenger information processor 410 transmits an image captured by a camera to the local determiner 510 or the remote determiner 550. The outside information processor 420 cuts information to be used by the local determiner 510 or the remote determiner 550 from a detection result of the outside information detector 230 and transmits the cut information to the local determiner 510 or the remote determiner 550. The outside information processor 420 transmits a detection result of a sensor that observes an outside state to the local determiner 510 or the remote determiner 550, for example.

The environment information processor 430 acquires detection results of various sensors and the like that acquire information regarding an environment and information that the provider 240 provides, cuts information to be used by the local determiner 510 or the remote determiner 550 from the acquired information, and transmits the cut information to the local determiner 510 or the remote determiner 550. In a case in which an index indicated by a sound pressure signal acquired by each microphone deviates from a reference value by a predetermined degree, for example, the signal generator 400 extracts the sound pressure signal and also transmits the extraction result to the local determiner 510 or the remote determiner 550 while variations in the sound pressure signal in a specific level is being detected.

The local determiner 510 performs determination in regard to the environment information on the basis of the detection result of the signal generator 400. The determination in regard to the environment information is evaluation for an event that is not related to an input and output context and environment attributes, for example. That is, the local determiner 510 determines whether or not the information acquired from the signal generator 400 satisfies event occurrence conditions. The local determiner 510 includes, for example, a local event determiner 520, a local attribute determiner 530, and a transmission signal generator 540.

The local event determiner 520 determines whether or not the detection result (environment information) of the signal generator 400 satisfies a predetermined condition. In a case in which the local event determiner 520 determines that the detection result satisfies the predetermined condition, the local event determiner 520 transmits information indicating the determination result to a local UI processor 610. The predetermined condition is that the detection result in related to the input and output context has been detected.

The local attribute determiner 530 determines whether or not predetermined environment attributes are included in the detection result of the signal generator 400. The environment attributes are, for example, information indicating an attribute indicating whether the vehicle is being traveling, information indicating an attribute indicating whether buildings are present in the surroundings, information indicating an attribute indicating whether tourist places are present in the surroundings, and information indicating an attribute indicating predetermined sound data (for example, a music). The transmission signal generator 540 transmits a processing result of the local event determiner 520 or the local attribute determiner 530 to the local UI processor 610.

The local UI processor 610 executes context processing. The local UI processor 610 performs evaluation of the input and output context and generation of a response. The local UI processor 610 includes, for example, a local intension estimator 620, a local response generator 630, and a transmission signal generator 640.

The local intension estimator 620 determines whether or not sound data is an input with intension on the basis of sound data. The local response generator 630 causes the virtual image generator 242 to generate a virtual image in accordance with a state of the passenger. The transmission signal generator 640 transmits the processing result of the local intension estimator 620 or the local response generator 630 to the provider 240. Information stored in a local storage 700 will be described later.

The experience providing system 1 further includes, for example, a remote determiner 550, a remote UI processor 650, a remote storage 710, and an external reference information 800. The remote determiner 550, the remote processor 650, the remote storage 710, and the external reference information 800 are provided at a location different from the vehicle.

The remote determiner 550 includes, for example, a remote event determiner 560, a remote attribute determiner 570, and a transmission signal generator 580. The remote event determiner 560 determines whether or not the detection result (environment information) of the signal generator 400 satisfies a predetermined condition. The remote attribute determiner 570 determines whether or not the detection result of the signal generator 400 includes predetermined environment attributes. The transmission signal generator 580 transmits the processing result of the remote event determiner 560 or the remote attribute determiner 570 to the remote UI processor 650. The provider 240 of the vehicle 200 executes an interaction by the processing result of the remote event determiner 560 or the remote attribute determiner 570 being transmitted to the remote UI processor 650.

The remote UI processor 650 executes context processing. The remote UI processor 650 performs evaluation of input and output context and generation of a response. The remote UI processor 650 includes, for example, a remote intension estimator 660, a remote response generator 670, and a transmission signal generator 680. The remote intension estimator 660 determines whether or not sound data is an input with an intension on the basis of sound data. The remote response generator 670 causes the virtual image generator 242 to generate a virtual image in accordance with a state of the passenger. The transmission signal generator 680 transmits the processing result of the remote intension estimator 660 or the remote response generator 670 to the provider 240.

The remote storage 710 stores information that is similar to information stored in the local storage 700, for example. The external reference information 800 includes information such as sound data such as a music, a pattern of the sound data, and the like.

Specific Examples

Figure 15:
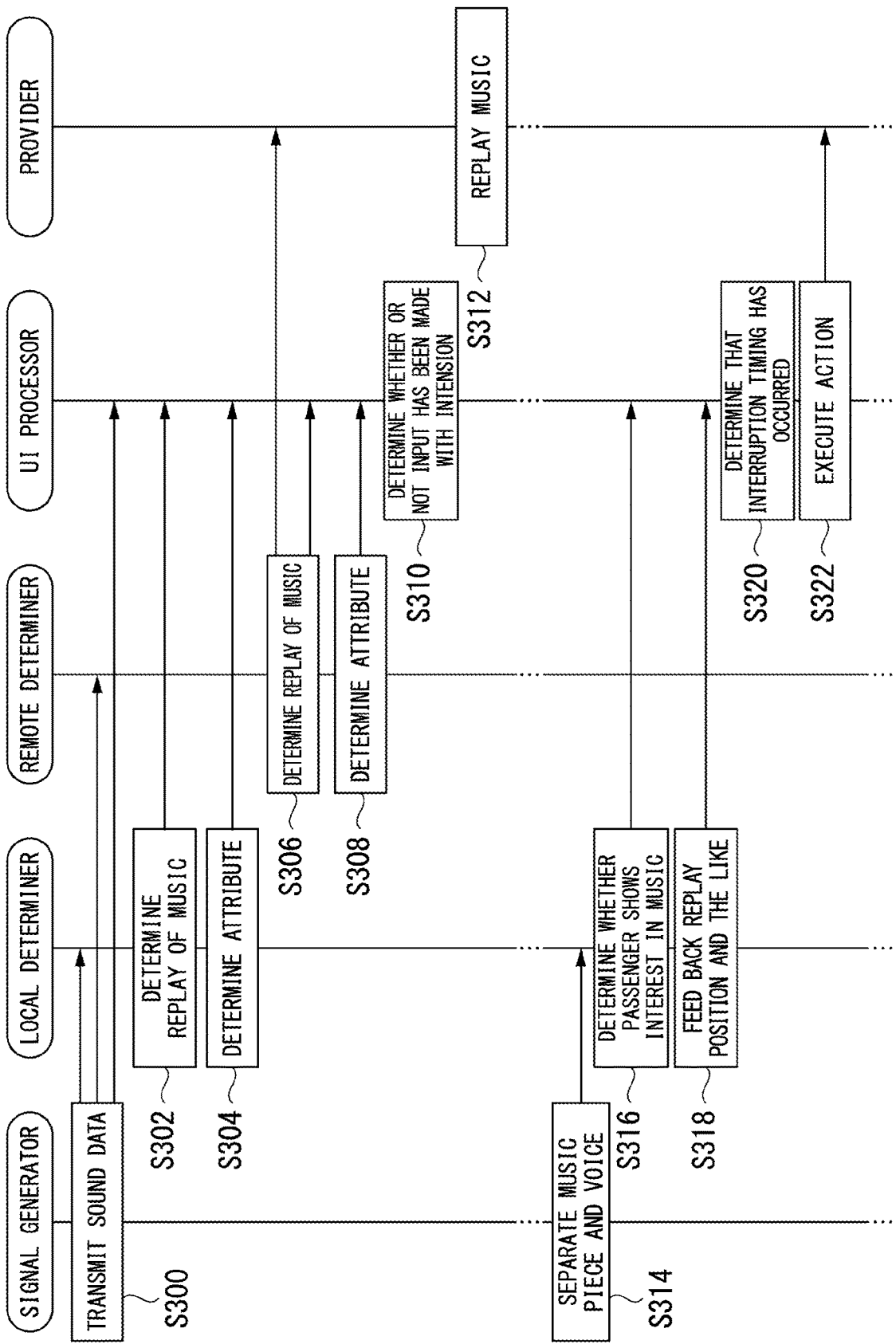
FIG. 15 is a sequence diagram showing a flow of processing in a case in which an interaction is executed in the vehicle.

Hereinafter, processing in a case in which interactions are executed in a vehicle will be described with reference to FIG. 15. The signal generator 400 acquires environmental sound inside the vehicle, for example, and transmits extracted sound data to the local determiner 510, the remote determiner 550, and the UI processor (the local UI processor 610 and the remote UI processor 650) every predetermined seconds (for example, every five seconds) on the basis of the acquired environmental sound (Step S300).

In a case in which it is determined that the pattern of the sound data transmitted by the signal generator 400 is similar to a pattern of sound data indicating a music, the local event determiner 520 determines to replay the music (Step S302). The local attribute determiner 530 determines attributes of the sound data. In a case in which the attributes include features, the local attribute determiner 530 transmits the determination result to the local UI processor 610 (Step S304).

The remote event determiner 560 determines whether or not an event of replaying a music is occurring on the basis of the sound data acquired from the signal generator 400 and the external reference information 800 (Step S306), further determines attributes such as an "artist A" and a "music piece B", and transmits the determination result to the remote UI processor 650 (Step S308).

Next, the local intension estimator 620 of the local UI processor 610 determines whether or not the sound data is an input with an intension on the basis of the sound data (Step S310). The local UI processor 610 determines whether or not the sound data is an input with an intension using, for example, an AI, an algorithm stored in advance, or the like. It is assumed that the input is determined to have been made without intension in Step S310. Thereafter, the provider 249 replays the music (Step S312). That is, when there are a plurality of interactions to be provided, the provider 240 determines execution timings of the plurality of interactions or whether or not it is possible to execute the plurality of interactions on the basis of the detection result of the passenger information processor 410 and the outside information processor 420 and provides the interaction to the passenger on the basis of the determination result.

In a next cycle, the signal generator 400 acquires sound inside the vehicle and separates the acquired sound into sound data and voice data of the music piece (Step S314). Next, the local event determiner 520 acquires the sound data and the voice data, and in a case in which it is determined from the data that the passenger is performing an action of hamming or tapping a rhythm, the local event determiner 520 determines that an event that the passenger "shows its interest in the music" has occurred (Step S316).

Further, the local event determiner 520 specifies a playback position and content information associated with the artist A from music piece information (music piece data or information regarding lyrics, a musical interval, and the like) that has already been specified on the basis of the external reference information 800 on the assumption that "an event of a playback position detection target has occurred" and feeds back the specification result to the signal generator 400 or the local UI processor 610 (Step S318).

The local UI processor 610 determines whether or not to execute a predetermined action under a circumstance that the playback position has been specified and additional information such as lyrics has been acquired (Step S320). For example, the local storage 700 stores information associating predetermined events with actions executed at the time of the events. For example, the local UI processor 610 determines "an interruption timing has occurred" when the following specific states occur, on the basis of information acquired from the signal generator 400 (Step S320). The specific states include a state in which the passenger has stopped hamming, a state in which the action of the passenger ends, or a state of a bridge of a music.

In a case in which the local UI processor 610 acquires the occurrence of the interruption timing from the local determiner 510, the local UI processor 610 executes an action on the basis of available content information stored in the local storage 700 (Step S322). The available content information is information of associating events with actions. The actions include an output for confirming an interest, such as a question of "do you like this song?" and a generation of singing along with the following music piece. Also, the processing in Steps S320 and S322 may be executed by the remote UI processor 650.

As described above, the provider 240 dynamically provides interaction to the passenger of the vehicle on the basis of the detection result of the passenger information processor 410 including interactions that have already been provided. In this case, the provider 240 may further take the detection result of the outside information processor 420 into consideration and dynamically provide interactions to the passenger of the vehicle.

[Processing in Case in which Multiple Events are Performed in Parallel in Addition to Above Processing]

For example, the local determiner 510 (or the remote determiner 550) continues to detect occurrence of an event in parallel during execution of the local UI processor 610 (remote UI processor 650), and the provider 240 dynamically provides an interaction on the basis of the occurrence of the event detected during the provision of the interaction.

For example, when the passenger moves its body to tap a rhythm in accordance with a music (or a bridge), the local response generator 630 causes the virtual image generator 242 to generate a virtual image so as to mirror the actions of the passenger in accordance with the music piece. When the passenger moves its body and taps a rhythm as described above, for example, the local response generator 630 causes the virtual image generator 242 to generate a virtual image so as to wave hands or clap in accordance with the interruption timing.

In a case in which the local event determiner 520 detects that there is a place such as a tourist place outside the vehicle and determines to cause a "tourist place discovery" event on the basis of sensor data extracted from the outside information processor 420 (for example, data of feature amounts extracted from an image captured by a camera), the local response generator 630 causes the provider 240 to output a comment such as "that is a tourist place C" in regard to the outside. Since the aforementioned parallel event is present, another event such as "occurrence of the interruption timing" and a response thereto may overlap. In this case, the local UI processor 610 determines priority for each of the overlapping events and the responses thereto and adjusts provision of a response and information to be output in accordance with the priority.

According to the aforementioned embodiment, it is possible to provide ways to entertain the passenger of the vehicle 200, which have never been achieved, by the experience providing system 1 including: the sound output section 244 configured to output sound; the virtual image generator 242 configured to cause a virtual image of a person that the passenger of the vehicle 200 can visually recognize to appear; and a provider 240 configured to provide content in which the sound output from the sound output section 244 is coordinated with actions of the virtual image caused to appear by the virtual image generator 242 for the passenger of the vehicle 200.

Although the form for carrying out the invention has been described above using the embodiment, the invention is not limited to such an embodiment at all, and various modifications and substitutions can be made without departing from the gist of the invention.

REFERENCE SIGNS LIST

1 Experience providing system
100 Content providing server
110 Communicator
120 Storage
122 Karaoke content data
130 Controller
132 Original data generator
132A utterance generator
132B singing voice generator
132C Action generator
134 Singing skill scorer
200 Vehicle
210 Communicator
220 Passenger information detector
220A In-vehicle camera
220B In-vehicle microphone
220C Seating sensor
230 Outside information detector
230A Outside-vehicle camera
230B Outside-vehicle camera
230C Outside-vehicle camera
230D Outside-vehicle microphone
240 Provider
242 Virtual image generator
242A Projection device
242B Front window
242C Left-side window
242E Mirror
242G Hologram projection device
242H Touch panel-type display device
242I Transmission panel-type display
244 Sound output section
244A Speaker
244B Speaker
244C Speaker
244D Speaker
246 Content player
250 Sound input section
250A Singing microphone
260 Virtual image selector
270 Content selector
280 Storage

What is claimed is:

1. An experience providing system comprising:
a processor configured to:
detect information regarding a passenger of a vehicle;
detect information outside the vehicle;
output a sound;
output a virtual image; and
dynamically provide an interaction to the passenger of the vehicle by synchronizing the sound with the virtual image on a basis of the information regarding the passenger and the information from outside the vehicle;
detect an occurrence of an event on a basis of the information regarding the passenger and the information from outside the vehicle;
control the interaction on a basis of the information regarding the passenger and the information from outside the vehicle;
continue detection of occurrence of the event in parallel with the interaction; and
dynamically provide the interaction on a basis of the occurrence of the event detected during provision of the interaction.

2. The experience providing system according to claim 1, wherein the processor is configured to cause the virtual image to appear so as to be superimposed on a captured image associated with a seat of the vehicle.

3. The experience providing system according to claim 1, wherein the processor is configured to cause the virtual image to appear so as to associate with a seat mirror image position of the vehicle when seen by the passenger.

4. The experience providing system according to claim 1, wherein the processor adjusts a timing at which the sound is output and performs an utterance on a basis of a situation outside the vehicle.

5. The experience providing system according to claim 1, wherein the interaction that is caused by the processor includes sound associated with music that is being heard in the vehicle and is detected based on the information regarding the passenger of the vehicle.

6. The experience providing system according to claim 1, wherein the processor is configured to cause music that is output as sound to be synchronized with the virtual image.

7. The experience providing system according to claim 6, a storage device configured to detect and store a state of the passenger of the vehicle in response to an interaction that the is caused by the processor, wherein the processor is configured to change the interaction that the passenger of the vehicle is able to use on a basis of the state.

8. The experience providing system according to claim 1, wherein the vehicle is an automated driving vehicle, and the processor is configured to determine whether or not automated driving of the vehicle is being executed, and restrict at least some action forms of the interaction during non-automated driving.

9. The experience providing system according to claim 1, wherein the processor is configured to execute the interaction using data provided from the outside the vehicle.

10. The experience providing system according to claim 1, wherein the interaction is provided through an output from an external processor, the external processor configured to process signals detected by the processor and the information from the outside the vehicle.

11. The experience providing system according to claim 1, wherein the interaction is a first interaction, and
wherein the processor is configured to detect that the first interaction has already been provided to the processor, and
dynamically provides a second interaction to the passenger of the vehicle on a basis of the information regarding the passenger and the first interaction that has already been provided.

12. The experience providing system according to claim 1, wherein, when a plurality of interactions to be provided by the provider are present, the processor determines execution timings of the plurality of interactions or whether or not the plurality of interactions are able to be executed on a basis of the information regarding the passenger and the information from the outside of the vehicle.

13. The experience providing system according to claim 1, wherein the processor is configured to:
detect occurrence of an event on a basis of the information regarding the passenger and the information from the outside of the vehicle,
wherein the processor
is configured to determine a first event in the vehicle, and determine a second event using an external server that is connected to the vehicle for communication.

14. An experience providing method comprising, by a vehicle-mounted computer:
   detecting passenger information;
   detecting outside information;
   outputting a sound;
   outputting a virtual image;
   dynamically providing an interaction to a passenger of a vehicle by synchronizing the sound with the virtual image on a basis of the passenger information and the outside information;
   detecting an occurrence of an event on a basis of the passenger information and the outside information;
   controlling the interaction on a basis of the passenger information and the outside information;
   continuing detection of occurrence of the event in parallel with the interaction; and
   dynamically providing the interaction on a basis of the occurrence of the event detected during provision of the interaction.

15. A non-transitory computer-readable storage medium that stores a computer program to be executed by a computer to perform at least:
   detect passenger information;
   detect outside information;
   output a sound;
   output a virtual image;
   dynamically provide an interaction to a passenger of a vehicle by synchronizing the sound with the virtual image on a basis of the passenger information and the outside information;
   detect an occurrence of an event on a basis of the passenger information and the outside information;
   control the interaction on a basis of the passenger information and the outside information;
   continue detection of occurrence of the event in parallel with the interaction; and
   dynamically provide the interaction on a basis of the occurrence of the event detected during provision of the interaction.

* * * * *